US008237876B2

(12) United States Patent
Tan et al.

(10) Patent No.: US 8,237,876 B2
(45) Date of Patent: Aug. 7, 2012

(54) TILTED C-PLATE RETARDER COMPENSATOR AND DISPLAY SYSTEMS INCORPORATING THE SAME

(76) Inventors: Kim Leong Tan, Santa Rosa, CA (US); Brett J. Bryars, Santa Rosa, CA (US); Karen Denise Hendrix, Santa Rosa, CA (US); David M. Shemo, Windsor, CA (US); Thomas Mayer, Santa Rosa, CA (US)

( * ) Notice: Subject to any disclaimer, the term of this patent is extended or adjusted under 35 U.S.C. 154(b) by 1010 days.

(21) Appl. No.: 11/419,872

(22) Filed: May 23, 2006

(65) Prior Publication Data

US 2006/0268207 A1     Nov. 30, 2006

Related U.S. Application Data

(60) Provisional application No. 60/684,329, filed on May 25, 2005, provisional application No. 60/715,829, filed on Sep. 9, 2005, provisional application No. 60/737,113, filed on Nov. 16, 2005.

(51) Int. Cl.
*G02F 1/1335* (2006.01)
(52) U.S. Cl. ................... 349/5; 349/8; 349/117
(58) Field of Classification Search ............... 349/5–10, 349/117–121
See application file for complete search history.

(56) References Cited

U.S. PATENT DOCUMENTS

| | | | |
|---|---|---|---|
| 2,478,385 A | 8/1949 | Gaiser | 359/580 |
| 3,185,020 A * | 5/1965 | Thelen | 359/586 |
| 3,463,574 A * | 8/1969 | Bastien et al. | 359/588 |
| 3,565,509 A | 2/1971 | Sulzbach | 359/588 |
| 3,604,784 A | 9/1971 | Louderback et al. | 350/164 |
| 3,781,090 A | 12/1973 | Sumita | 350/164 |
| 3,799,653 A | 3/1974 | Ikeda | 350/164 |
| 3,822,926 A | 7/1974 | Dalbera et al. | 359/586 |
| 3,936,136 A | 2/1976 | Ikeda et al. | 350/1 |
| 4,313,647 A | 2/1982 | Takazawa | 350/164 |
| 4,666,250 A | 5/1987 | Southwell | 359/586 |
| 5,142,393 A | 8/1992 | Okumura et al. | 349/121 |

(Continued)

FOREIGN PATENT DOCUMENTS

EP     0621499     10/1994

OTHER PUBLICATIONS

Karen Hendrix et al., "Birefringent Films for Contrast Enhancement of Liquid Crystal on Silicon Projection Systems", Journal of Vacuum Science and Technology A. Vacuum, Surfaces and Films, American Institute of Physics, New York, NY, vol. 24, No. 4, Jun. 23, 2006, pp. 1546-1551.

(Continued)

*Primary Examiner* — Mark Robinson
*Assistant Examiner* — Charles Chang
(74) *Attorney, Agent, or Firm* — Matthew A. Pequignot; Pequignot + Myers LLC

(57) ABSTRACT

A C-plate compensator is disclosed for compensating the residual A-plate and C-plate retardance of a reflective liquid crystal on silicon (LCoS) display or a transmissive liquid crystal (LC) display in a projection display system. The C-plate incorporates a form-birefringent coating, whose retardance magnitude can be adjusted by tilting with respect to the display panel (X-Y) plane. The tilted plate is rotated about the Z-axis by a prescribed amount from the slow axis of the display panel. Criteria are described for choosing the tilt and rotation angles such that the contrast of the display system produced by the compensated panel is optimized.

17 Claims, 24 Drawing Sheets

U.S. PATENT DOCUMENTS

| | | | |
|---|---|---|---|
| 5,184,237 A | 2/1993 | Iimura et al. | 349/119 |
| 5,196,953 A | 3/1993 | Yeh et al. | 349/119 |
| 5,220,447 A | 6/1993 | Yokokura et al. | 349/119 |
| 5,375,006 A * | 12/1994 | Haas | 349/120 |
| 5,490,006 A * | 2/1996 | Masumoto et al. | 349/117 |
| 5,688,566 A | 11/1997 | Broer et al. | 428/1.31 |
| 5,777,709 A | 7/1998 | Xu | 349/120 |
| 5,798,808 A | 8/1998 | Van Haaren et al. | 349/96 |
| 5,895,106 A | 4/1999 | VanderPloeg et al. | 349/120 |
| 5,986,733 A * | 11/1999 | Winker et al. | 349/120 |
| 6,057,901 A | 5/2000 | Xu | 349/121 |
| 6,175,400 B1 | 1/2001 | Duncan et al. | 349/117 |
| 6,356,325 B1 | 3/2002 | Shimoshikiryo | 349/121 |
| 6,556,266 B1 | 4/2003 | Shirochi et al. | 349/118 |
| 6,585,378 B2 | 7/2003 | Kurtz et al. | 353/31 |
| 6,587,171 B1 | 7/2003 | Georges et al. | 349/120 |
| 6,805,445 B2 * | 10/2004 | Silverstein et al. | 353/20 |
| 6,805,924 B1 | 10/2004 | Ishikawa et al. | 428/1.1 |
| 6,857,747 B2 | 2/2005 | Pentico et al. | 353/31 |
| 6,885,422 B2 | 4/2005 | Suzuki et al. | 349/121 |
| 6,909,473 B2 | 6/2005 | Mi et al. | 349/5 |
| 6,912,030 B1 | 6/2005 | Coates | 349/119 |
| 7,006,184 B2 * | 2/2006 | Mi et al. | 349/130 |
| 7,030,951 B2 * | 4/2006 | Suzuki et al. | 349/117 |
| 7,345,723 B2 | 3/2008 | Robinson et al. | 349/117 |
| 2002/0047968 A1 | 4/2002 | Yoshida et al. | 349/117 |
| 2004/0114079 A1 | 6/2004 | Kurtz et al. | 349/117 |
| 2005/0128380 A1 | 6/2005 | Zieba et al. | 349/96 |
| 2005/0128391 A1 | 6/2005 | Tan et al. | 349/117 |
| 2006/0285042 A1 | 12/2006 | Chen et al. | 349/117 |

OTHER PUBLICATIONS

C. Pentico, M. Newell and M. Greenberg, "Ultra high contrast color management system for projection displays," SID 03 Digest, pp. 130-133, 2003.

D. Hansen, E. Gardner, R. Perkins, M. Lines, and A. Robbins, "The display applications and physics of the Proflux wire grid polarizer," SID 02 Digest, p. 730, 2002.

D. Anderson and K. Shahzad, "Off-axis LCoS compensation for enhanced contrast," SID 03 Digest, pp. 1433-1435, 2003.

J. Chen, M.G. Robinson and G.D. Sharp, "General methodology for LCoS panel compensation," SID 04, Digest, pp. 990-993, 2004.

K. Tan et al., "Design and characterization of a compensator for high contrast LCoS projection systems," SID 2005, p. 1810, 2005.

H. Mori, et al., "Novel optical compensation method based upon a discotic optical compensation film for wide-viewing-angle LCDs," SID 03 Digest, p. 1058, 2003.

M. Duelli et al., "High performance contrast enhancing films for VAN-mode LCoS panels," SID 05 Digest, p. 892, 2005.

U.S. Appl. No. 11/419,872, filed May 23, 2006, Tan et al.

H. Seiberle, K. Schmitt and M. Schadt, "Multidomain LCDs and Complex Optical Retarders Generated by Photo-alignment," Proc. Eurodisplays '99, pp. 6-9, Sep. 1999.

"Birefringent Compensators for Normally White TN-LCD's", Eblen J.P. et al, Society for Information Display, SID International Papers, San Jose, Jun. 14-16, 1994; Santa Ana SID, U.S. vol. 25, Jun. 14, 1994, pp. 245-248, XP000462707, Chapter, Design.

X.J. Yu et al., "Optical wire-grid polarizers at oblique angles of incidence," J. Appl. Phys. 93(8), Apr. 15, 2003, pp. 4407-4412.

S-Y. Lu and R. Chipman, "Interpretation of Mueller matrices based on polar decomposition," J. Opt. Soc. Am., 13, pp. 1106-1113, 1996.

J. E. Anderson et al. "Fast VAN LCoS Microdisplay," SID 05 Digest, pp. 1366-1369, 2005.

S. Hashimoto et al. "SXRD (Silicon X-tal Reflective Display): A new display device for projection displays," SID 05 Digest, pp. 1362-1365, 2005.

Sergan et al. "Measurement and modeling of optical performance of wire grids and liquid-crystal displays utilizing grid polarizers," J. Opt. Soc. Am. A, 19(9), p. 1872, 2002.

J. Chen, M.G. Robinson, D.A. Coleman, and G.D. Sharp, "Impact of the Orientation of Panel Pretilt Directional and Quarter-wave Plate on LCoS Projection System Contrast," SID 06, Digest, pp. 1606-1609, 2006.

J. Chen, "Impact of the Orientation of Panel Pretilt Direction and Quarter Wave Plate on LCOS Projection System Contrast", Boulder, Colorado, pp. 1-5.

* cited by examiner

LCoS Projection System

TILTED C-PLATE RETARDER COMPENSATOR AND DISPLAY SYSTEMS INCORPORATING THE SAME

CROSS REFERENCE TO A RELATED APPLICATION

The present invention claims priority from U.S. Provisional Patent Applications No. 60/684,329 filed May 25, 2005, 60/715,829 filed Sep. 9, 2005 and 60/737,113 filed Nov. 16, 2005, which are incorporated herein by reference for all purposes. This application is related to U.S. patent application Ser. No. 11/009,476 filed on Dec. 10, 2004, which is incorporated herein by reference for all purposes.

FIELD OF THE INVENTION

This invention relates to transmissive liquid crystal displays as well as reflective liquid crystal on silicon displays and image projection systems based on such displays. In particular, it discloses an improved means of compensating the residual retardance of the liquid crystal display panel. Specifically, a C-plate with appropriate tilting and rotation is used as a retardance compensator to enhance the image contrast of the image produced by the display panel.

BACKGROUND OF THE INVENTION

The wire grid polarizer (WGP) based Liquid Crystal on Silicon (LCoS) microdisplay projection system (MDPS) [C. Pentico, M. Newell and M. Greenberg, "Ultra high contrast color management system for projection displays," SID 03 Digest, pp. 130-133, 2003; also U.S. patents, Kurtz et al, U.S. Pat. No. 6,585,378 and Pentico et al. U.S. Pat. No. 6,857,747] realizes both high resolution and high image contrast in comparison to other micro-display projection display technologies (such as transmissive Liquid Crystal Micro-Display (xLCD) and Digital Light Processor (DLP)) and direct-view display panels. The lack of on-screen brightness is mitigated by the use of three microdisplay panels, one for each primary color band. An example of the WGP-based projection system is given in FIG. 1. The light from a high-pressure discharge lamp is homogenized by a long light rod (pipe). The light may also be preferentially polarized or have its unused portion recycled. A spatially uniform light distribution at the exit of the light pipe is imaged by a series of lenses, fold mirrors and dichroic band splitters to one or more LCoS panels (in a one-, two-, three- and four-panel polarization based MDPS). In a WGP-based MDPS, the primary function of the wire-grid polarizers is to separate the outgoing light beam from the incoming light beam [D. Hansen, E. Gardner, R. Perkins, M. Lines, and A. Robbins, "The display applications and physics of the Proflux wire grid polarizer," SID 02 Digest, p. 730, 2002]. In this respect, the WGP is typically tilted at ±45° with respect to the principal direction of light propagation in a given LCoS panel illumination arm. The return light from each LCoS panel is then steered (deflected) to an orthogonal path, relative to the incoming illumination. The WGP also serves as a polarizing device. The WGP is a grid-polarizer, namely, it transmits a linear polarization aligned orthogonal to the direction of parallel micro-wires and reflects a complementary linear polarization parallel to the direction of the wires. When used in off-normal incidence, the WGP is configured as a high polarization-contrast mode if the transmitted linear polarization is contained in the plane of incidence (P-plane). In the diagram of FIG. 1, this high contrast configuration requires the micro-wires to be oriented parallel to the S-plane (orthogonal to the plane of incidence with respect to the central ray). The wires are aligned perpendicular to the plane of drawing in FIG. 1. Due to the trade-off between brightness and aperture of optical system ("Etendue"), the MDPS also requires the use of a moderate numerical aperture of each optical element. It is typical to configure the optical elements to function well with f/2.4 system (approximately ±12° in air incidence). The P- and S-plane of polarizations then refer to the linear polarization of the central ray in the cone bundle (hereafter term the principal ray) with respect to each local WGP element.

In the 3-panel WGP-based MDPS shown in FIG. 1, the images displayed by LCoS panels 15, 15a and 15b (corresponding to red, green and blue color channels, respectively) are aggregated (converged) by an X-cube 19 and then projected to a large screen. Each color channel has an LCoS panel, a WGP, either tilted at +45°, or at −45°, as a beam splitter and polarizer/analyzer as well as a dedicated trim retarder compensator: 21, 21' and 21", each associated to panel 15, 15a and 15b, respectively. Each color channel also has its own pre-polarizer oriented to transmit P-polarization (one or more elements of WGPs or dichroic sheet polarizers oriented at normal incidence with respect to the principal ray; these are not shown in FIG. 1) and clean-up analyzer oriented to transmit S-polarization (one or more elements of WGPs or dichroic sheet polarizers oriented at normal incidence with respect to the principal ray; these are also not shown in FIG. 1).

The trim retarder compensator is the crucial optical element in each color channel of the MDPS. It removes the residual LCoS panel retardance in the panel off-state [D. Anderson and K. Shahzad, "Off-axis LCoS compensation for enhanced contrast," SID 03 Digest, pp. 1433-1435, 2003]. The residual LCoS panel retardance can be categorized into in-plane (also A-plate) and out-of-plane (also C-plate) components. Here, the term "retardance' refers to linear retardance magnitude unless stated otherwise. Linear retardance causes a phase difference to two orthogonal linear polarizations, aligned parallel to the extra-ordinary and ordinary axes of the linear retarder. There is also a type of retardance called "circular retardance" which causes a relative phase difference of right- and left-handed circular polarized light. Normal incidence rays in the cone bundle see only the A-plate retardance, whereas off-axis rays (both oblique, i.e. non-normal but along the principal S- and P-planes; and skew, i.e. non-normal and incident away from the principal S- and P-planes) experience the C-plate retardance in addition to the A-plate retardance. A-plate retardance is not seen at the trivial situation of 90° ray angle in the birefringent medium).

In the nominal A-plate compensation scenario, the A-plate retardance of the compensator matches that of the LCoS panel in the off-state. The slow axes of both compensator and the LCoS panel are configured at orthogonal azimuthal offset (termed "crossed axes"). The same applies to the two fast axes. The role of the fast/slow axes switches from the trim retarder compensator element to the LCoS panel element for normal incidence light. The light of a given linear polarization is alternately delayed more then less, or vice-versa in the two successive elements. The net effect is zero relative delay for the incoming polarization. Thus the output polarization from the pair of trim retarder and panel in the off-state is unchanged versus their input polarization. This output light is then rejected by the combination of WGP and clean-up polarizer, whereby the high-reflection axis for the WGP and the high-transmission axis for the clean-up polarizer are at orthogonal orientation to the incoming polarization to the trim retarder and panel pair. The illumination for dark-state panel then does not appear on the screen. The introduction of the trim retarder as a compensator also does not alter significantly the throughput of the panel on-state. Hence the sequential contrast (full on/full off) is excellent.

In practice, the A-plate retardance of both the LCoS and the compensator show a range of values due to manufacturing tolerances in device thickness and material birefringence control as well as operational drifts (temperature, mechanical stress etc). It is then typical to provide for a higher A-plate retardance in the compensator than the value of the nominal LCoS panel retardance [J. Chen, M. G. Robinson and G. D. Sharp, "General methodology for LCoS panel compensation," SID 04, Digest, pp. 990-993, 2004]. For example, a vertical aligned nematic (VAN) LCoS may exhibit a 2 nm A-plate retardance (at λ=550 nnm) whereas the trim retarder compensator might be fabricated with a 5 nm (at λ=550 nnm) A-plate retardance. This mismatch in A-plate value requires offsetting of the optic axis of the compensator, relative to the nominal crossed axes configuration of trim retarder compensator/LCoS panel pair. With a VAN-LCoS, the slow axis of the panel is typically configured substantially parallel to the bisector of the S- and P-planes (i.e., slow axis at ±45° and ±135° where the P-polarization is parallel to 0°/180° and S-polarization is parallel to ±90°). This configuration is crucial to utilizing the VAN-LCoS panel as an efficient electrically-controlled birefringence (ECB) device, with the crossed polarization conversion for this reflective device is given by:

$$I(\text{output crossed polarization}) = I(\text{input linear polarization}) * [\sin(\Delta n d / \lambda) * \sin(2\phi)]^2,$$

where Δnd is the single-pass retardance of the VAN-LCoS panel; λ is the illumination wavelength and φ is the orientation of the slow-axis relative to the P-polarization. As a consequence of the ECB requirement, VAN-LCoS is typically configured as an approximate quarter-waveplate retarder in single pass (in the panel on-state) and its slow/fast axes approximately bisect the S- and P-polarization planes.

For the purpose of describing the invention, references will be made to a single color-channel in VAN-mode LCoS microdisplay projection core optics. The single channel description is part of a one or more panel WGP-based microdisplay projection systems. Also, the pre-polarizer before the WGP and the clean-up polarizer after the WGP reflection is aligned non-tilted, with respect to the principal ray propagation direction. The pre-polarizer comprises one or more stages of substantially parallel elements of grid-based (reflective) polarizers (such as aluminum wire grid) or regular dichroic sheet (absorptive) polarizers. The clean-up polarizer comprises one or more stages of substantially parallel absorptive polarizer elements.

A schematic representation of the core optics 200 of either the red or the blue channel in FIG. 1 light engine is depicted in FIG. 2. The cone of light output from the prior stage light pipe (or other homogenizer such as Fly's Eye Array), either unpolarized or partially polarized, is linear polarized by the pre-polarizer 201. The transmission axis of this polarizer 220 is substantially parallel to the transmission axis of the subsequent WGP element 202. This linear polarization direction is termed "P-polarization", with reference to the principal ray and the conical mount of the WGP element. The WGP element is said to have been rotated at +45° about the +Y-axis and with respect to the +Z-axis (or simply tilted at +45° w.r.t. Z-axis). This adheres to the convention of Euler angle rotation with a Right-Handed XYZ coordinate system (RH-XYZ). Similarly, the core optics of the green channel (not shown) has the WGP tilted at −45° w.r.t. Z-axis and the return pass to the WGP being steered towards a clean-up polarizer positioned at the reflected port of WGP in return pass.

The micro-wires on the surface of the WGP element 202 are aligned parallel to the Y-axis in the drawing. The wires are located on the rear-side of the WGP substrate (away from the input) such that the linear polarized light is less affected by the thermal and mechanical stress-induced birefringence in the substrate. After a complete double pass, having traversed the parallel stages of the trim retarder compensator (TR) 203 and the VAN-LCoS panel 204, the beam is analyzed by the WGP element. The orthogonal polarization, S-polarization, as reflected by the wire-side of the WGP element is deflected towards the clean-up polarizer 205, having a transmission axis orthogonal to the pre-polarizer. The analyzer polarization is shown as 221. This reflected light does not pass through the WGP substrate and hence is less affected by the induced birefringence in the substrate.

The LCoS panel has been shown with its slow-axis (SA) 230 located in the first quadrant of a RH-XYZ coordinate system, while looking at the beam coming to the observer in the first pass (RH-XYZ). In describing the SA of a VAN-LCoS panel, reference is made to the azimuthal orientation of the SA with a polar angle tilt towards +z axis (positive tilt). In this prior art example shown, the LCoS SA is given by the azimuthal angle 235, counter-clockwise (CCW) from the X-axis being positive angles. The fast-axis (FA) of the VAN-LCoS panel is defined as being orthogonal to the SA orientation (i.e., ±90° azimuthal offset to SA). This FA 231 is shown as being located in quadrant 2 and 4, at +135°/−45° azimuthal angles from the X-axis. The trim retarder compensator 203 in the case of higher-value retardance has to be rotated or clocked to orient its SA in the quadrant neighboring the LCoS SA, so that the two sets of slow axes are not crossed. An example of a generic trim retarder compensator is shown as element 203 with its slow-axis 240 oriented at the azimuthal angle 245. For a moderately higher trim retarder compensator retardance and a rather low VAN-LCoS panel retardance, the trim retarder compensator SA can typically deviate up to 30° from the closest S- or P-axis, although a deviation of less than 15° is preferable. The terms SA and FA when used for both VAN-LCoS panels and trim retarder compensators here refer to the two orthogonal birefringent axes when the linear retardance is measured at normal incidence. The SA and FA orientations change with off-axis illuminations, as well as reversing of SA/FA roles for a negative out-of-plane retardance component at a sufficiently large angle of incidence.

In the prior-art disclosures, the optimal trim retarder compensator incorporates an A-plate element and a −C-plate element (out-of-plane retardance with negative sign of birefringence). This trim retarder compensator is aligned substantially parallel to the LCoS X-Y plane. The requirements for a good trim retarder compensator device are well known [see for example K. Tan et al., "Design and characterization of a compensator for high contrast LCoS projection systems," SID 2005, p. 1810, 2005]. There are a variety of materials being used to realize the compensator A-plate and −C-plate retardance. Traditionally, an isotropic polymer is stretched either in one or two axes and the resultant biaxial or uniaxial negative layer can be used to fully compensate for LCoS panel retardance [H. Mori, et al., "Novel optical compensation method based upon a discotic optical compensation film for wide-viewing-angle LCDs," SID 03 Digest, p. 1058, 2003].

More recently, liquid crystal mixture crossed linked into a polymer host (LCP) has been shown to be more versatile in terms of reliability, uniformity and ease of targeting retardance values [Zieba et al. US Patent Application Publ. No. 20050128380]. The LCP layer is integrated with inorganic thin-films to realize the −C-plate components [Tan et al, US Patent Application Publ. No. 20050128391]. The full function trim retarder compensator has been shown to provide compensation for excellent contrast as well as being environmentally stable [M. Duelli et al., "High performance contrast enhancing films for VAN-mode LCoS panels," SID 05 Digest, p. 892, 2005].

The invention disclosed here employs a form birefringent film tilted at an angle to compensate the retardance of a reflective LCoS or transmissive LC device in the dark-state resulting in significant improvement in contrast. The birefringent film has a uniaxial indicatrix and it is configured with its C-axis parallel to the device normal.

Such a birefringent component does not contain organic materials and consequently avoids reliability failures or contrast degradation over time which are inherent risks with organic birefringent devices in prior-art retarder applications. A C-plate-only retarder is a birefringent element where the axis of optical symmetry lies along the device normal of a substantially parallel plate. A C-plate retarder does not present any net retardation for normal-incidence rays. For off-normal rays, extra-ordinary rays (e-wave), the effective index of refraction can be higher or lower value than the index value of the orthogonal, ordinary ray (o-wave) polarization. This means the C-plate can possess either a positive C or a negative C retardance.

In addition to the reliability improvement over the prior-art retarder technologies, the use of C-plate-only retarder at a tilted alignment is advantageous for substantially reducing the retarder cost by reducing the number of elements in the optical system as well as simplifying assembly.

SUMMARY OF THE INVENTION

This invention relates to the use of a C-plate retardance compensator to enhance the image contrast of transmissive as well as reflective liquid crystal displays and display systems. Improved residual retardance compensation is achieved by introducing a small tilt angle to the compensator with respect to the system X-Y-plane as well as choosing an appropriate rotation angle of the tilted plate about the Z-axis in relation to the display panel slow axis.

BRIEF DESCRIPTION OF THE DRAWINGS

Exemplary characteristics of the invention will now be described in conjunction with the following drawings.

DETAILED DESCRIPTION OF PREFERRED EMBODIMENTS

Figure 1:
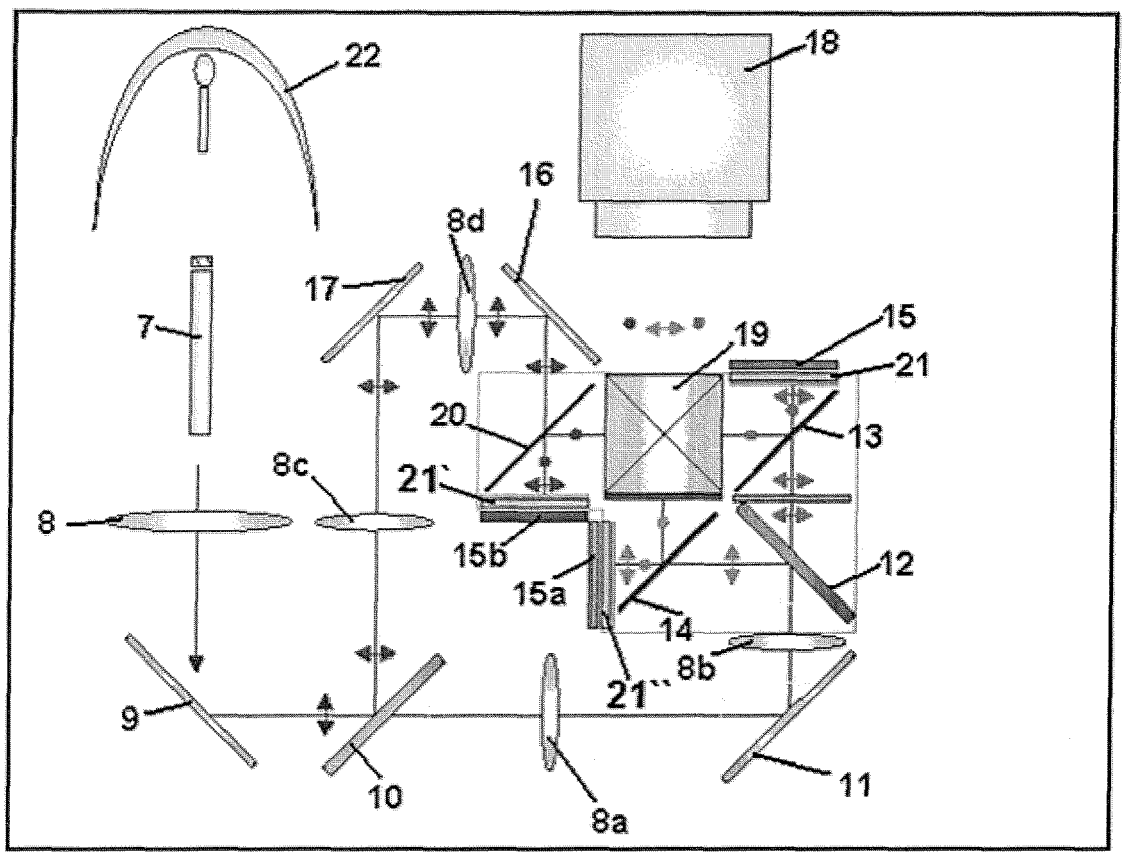
FIG. 1 is a schematic diagram of the prior art Ultrex-3 3-panel Wire-grid Polarizer (WGP) based Liquid Crystal on Silicon (LCoS) projection light engine.
Figure 2:
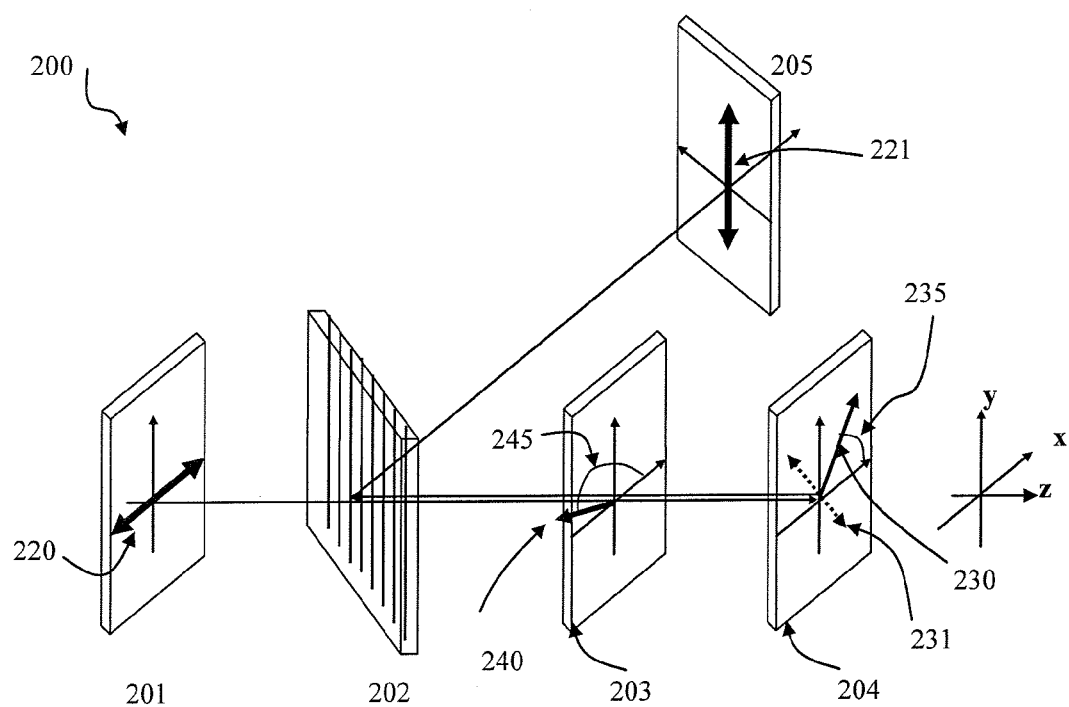
FIG. 2 illustrates a prior art subsystem of wire grid polarizer (WGP) based light engine including an LCoS panel, WGP, trim retarder compensator, and pre- and post-polarizers.
Figure 3:
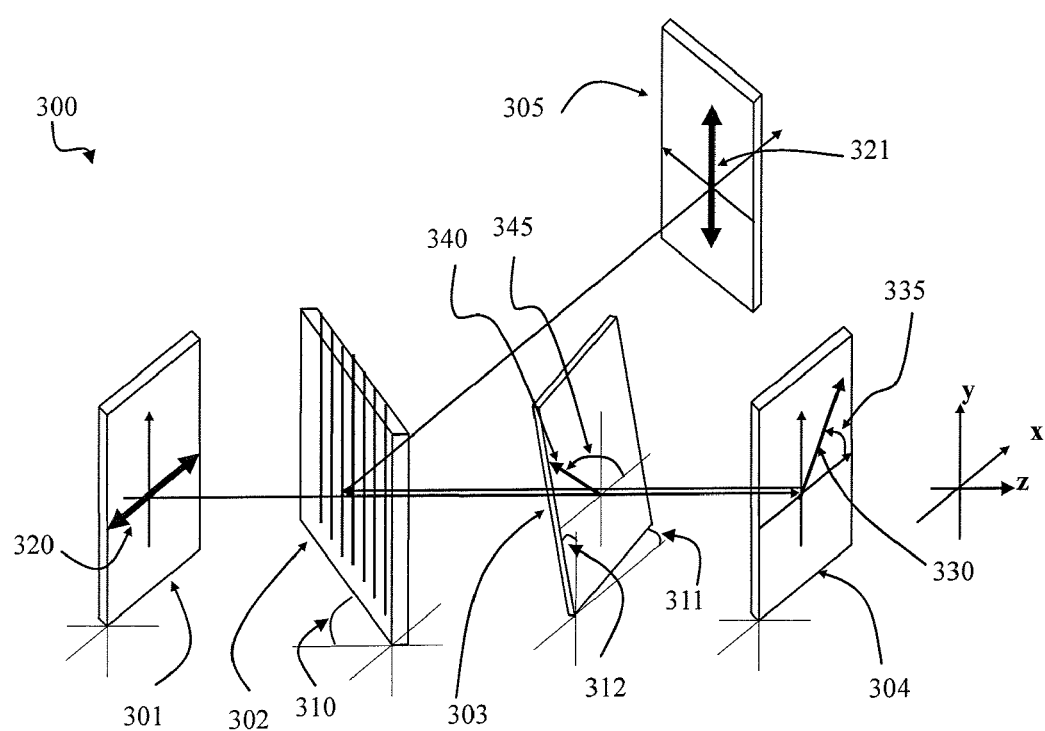
FIG. 3 illustrates an embodiment of a subsystem of wire grid polarizer (WGP) based reflective light engine including an LCOS panel, WGP, a tilted C-plate-only retarder compensator, and pre- and post-polarizers.
Figure 4A:
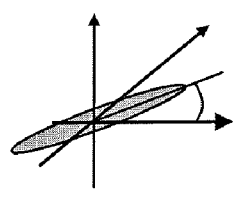
FIGS. 4a-d defines the uniaxial birefringent indicatrix configurations used: (a) A-plate, (b) C-plate and (c) O-plate for the given XYZ coordinate system in (d) where the device plane is parallel to the XY plane and the Z-axis is parallel to the device normal.
Figure 4B:
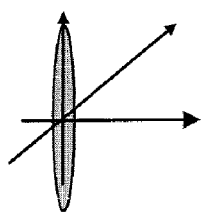
Figure 4C:
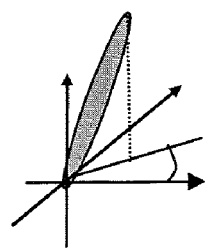
Figure 4D:
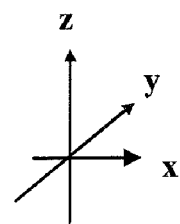

The preferred embodiment of this invention is illustrated by the example in FIG. 3. In the schematic representation of the core optics 300, the cone of light output from the prior stage light pipe (or other homogenizer such as Fly's Eye Array), either unpolarized or partially polarized, is linear polarized by the pre-polarizer 301. The transmission axis of this polarizer 320 is substantially parallel to the transmission axis of the subsequent WGP element 302: this is the P-polarization axis. The WGP element is tilted at polar angle 310, at approximately +45° w.r.t. Z-axis. After a complete double pass, having traversed the non-parallel stages of the trim retarder compensator (TR) 303 and the VAN-LCoS (LCoS) panel 304 having its slow-axis 330 oriented at 335 azimuthal angle w.r.t. X-axis, the beam is analyzed by the WGP element 302. The orthogonal polarization, S-polarization, as reflected by the wire-side of the WGP element is deflected towards the clean-up polarizer 305, having a transmission axis orthogonal to the pre-polarizer. The analyzer polarization is shown as 321.

Optical element 303 differs from prior-art retarder compensator in several key aspects. Optical element 303 is configured as a C-plate retarder, as opposed to the more typical A/-C-plate retarder, A-plate-only retarder or biaxial retarder 203 in prior art optical system 200.

The C-plate retarder element 303 is aligned with its device plane being non-parallel to the device plane of LCoS 304 whereas the parallel alignment is typically found in the corresponding retarder compensator 203 and LCoS 204 in prior art optical system 200. In optical system 300, C-plate retarder compensator 303 is aligned at a polar angle tilt 311 versus the system X-axis and at a polar angle tilt 312 versus the system Y-axis. This two-dimensional tilt gives rise to an axis of rotation 340, oriented at an azimuthal angle 345, w.r.t. X-axis. The axis of rotation 340 is parallel to the LCoS device plane (also the system X-Y-plane) and the Z-axis is the propagation axis of the principal ray w.r.t. the first pass.

By adhering to the Euler angle rotation convention (positive angle for CCW rotation about +X, +Y and +Z axes), the effective polar angle components about the X and Y-axis can be written as, $\theta_x = \theta_t^* \sin(\phi_{ax})$ and $\theta_y = \theta_t^* \cos(\phi_{ax})$, respectively, where $\theta_t$ is the full tilt angle of the C-plate retarder 303, being rotated out-of-plane, about an axis aligned at azimuthal angle $\phi_{ax}$. Upon this rotation, C-plate retarder compensator 303 becomes non-parallel to the LCoS 304. The axis of rotation spans 0 to 360°, in order to distinguish forward vs. backward tilting. The tilted C-plate retarder compensator in this invention must be tilted in two dimensions, according to the XYZ coordinate system shown here. This means the effective fast- and slow-axis of the tilted C-plate must not align to the system S- or P-polarization axis in core optical system 300, i.e., $\phi_{ax} \neq 0°$, $\phi_{ax} \neq \pm 90°$ and $\phi_{ax} \neq 180°$.

The polar angle tilt, $\theta_t$, of the C-plate retarder compensator can range from 0.1° to 45°, preferably, 0.1° to 30° and more preferably 0.1° to 15°. The polar angle tilt refers to the magnitude of the out-of-plane tilt, positive and negative polar angles (forward tilt toward and backward tilt from the LCoS plane, respectively) are determined by the axis of rotation. The polar angle tilt is set to produce a suitable amount of net retardance taking into consideration the designed C-plate retardance, the additional Z-axis space requirement and the acceptable image impairment resulting from parallax introduced by the tilted plate.

The C-plate retarder compensator when used at normal-incidence does not have fast/slow axes as the residual net retardance is very low, being mostly contributed by the induced birefringence in the substrate. In the preferred embodiment, the compensator utilizes a −C-plate retarder. The nominal rotational axis of the tilted −C-plate is oriented parallel to the fast axis of the LCoS panel (typically ±45° azimuthal angle with respect to the plane-of-incidence, P-plane of the WGP). As the C-plate retarder is tilted from parallel alignment to the LCoS element, the net retardance in nanometer units (magnitude of retardation) is given by, $$\Gamma_{TR}(\theta) = [\sigma_e(\theta) - \sigma_o(\theta)]^* d_{TR}, \quad (1)$$

with the eigenmodes of the e- and o-waves ($\sigma_e$, $\sigma_o$) given by, $$\sigma_e(\theta) = n_o \sqrt{1 - \frac{\sin^2(\theta)}{n_e^2}} \quad \text{and} \quad (2)$$

$$\sigma_o(\theta) = n_o \sqrt{1 - \frac{\sin^2(\theta)}{n_o^2}} ; \quad (3)$$

where $n_e$ and $n_o$ are the extraordinary and ordinary indices, respectively, for an incidence ray at wavelength $\lambda$; the light is incident in air at $\theta$ polar angle w.r.t. C-plate device normal and $d_{TR}$ is the C-plate retarder thickness in nanometer units. The net retardance has a positive sign for +C-plate and a negative sign for −C-plate retarder.

The optical symmetry for a uniaxial birefringent medium is illustrated in FIG. 4. In FIG. 4(a), an A-plate retarder element is sketched whereby the optic axis is aligned parallel to the device plane (X-Y-plane). The device normal is parallel to the Z-axis. It's assumed that X and Y dimensions of the part are much larger than the thickness dimension along Z-axis. The C-plate symmetry is illustrated in FIG. 4(b). The optic axis is aligned parallel to the device normal. It's noted that a positive uniaxial birefringence has been sketched, where the extraordinary (e-) index is greater than the ordinary (o-) index and the e-wave direction is pointed along the Z-axis. In a −C-plate element, which is the preferred embodiment in this invention, the index indicatrix is "disc" like, with its e-wave direction again pointed along the Z-axis. For a general optic axis alignment, an oblique symmetry (O-plate) is obtained, as indicated in FIG. 4(c). This configuration has an in-plane (also termed A-plate) retardance, with its fast/slow axes oriented parallel and perpendicular to the projection onto X-Y plane. The out-of-plane (also termed C-plate) component is also present for a general O-plate retarder element. The device X-, Y- and Z-directions are as indicated by the arrows in FIG. 4(d).

Figure 5A:
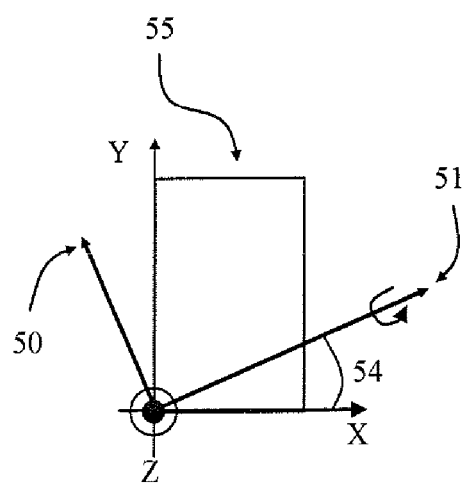
FIGS. 5a & b show the relation of effective fast/slow axes of a tilted C-plate where the C-plate birefringence is negative (a) and positive (b).
Figure 5B:
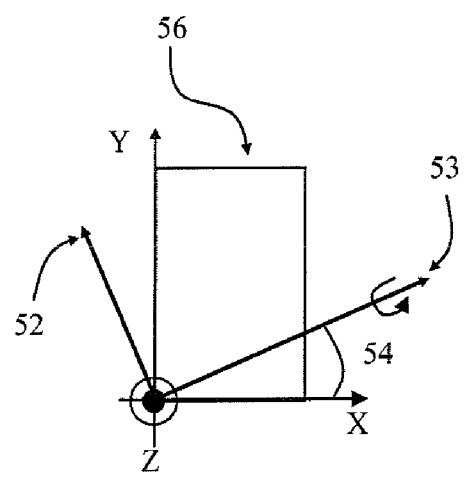

The assignment of fast/slow axes of a tilted C-plate retarder compensator relative to the axis of rotation is dependent the sign of C-plate retardance. This is illustrated in FIG. 5. In FIG. 5(a), a −C-plate 55 is tilted out-of-plane about a rotation axis 51, oriented at an azimuthal angle 54 ($\phi_{ax}$) with respect to the X-axis. The axis of rotation 51 lies parallel to the X-Y plane. After the tilting, this axis is the effective slow-axis for principal ray in optical system 300. The fast-axis 50 of this tilted −C-plate lies on the tilted surface at ±90° offset from the slow-axis. When this axis is projected onto the X-Y plane, the effective fast-axis still substantially perpendicular to the slow-axis 51 if the polar angle tilt is small. In FIG. 5(b), shows that the assignment of the fast 53 and slow axes 52 in a +C-plate 56 is opposite to that in a −C-plate 55. The axis of rotation makes an azimuthal angle 54 with respect to the X-axis. The slow-axis 52 of this tilted—C-plate lies on the tilted surface at ±90° offset from the fast-axis.

In the application of LCoS residual compensation with a trim retarder, the ideal scenario involves matching the effective on-axis retardance of the compensator to that of LCoS A-plate retardance (termed "matched-value-compensation"). The fast/slow axes sets of the retarder and the LCoS are at crossed-axes as alluded to in prior-art. In the case of using a tilted −C-plate retarder as a compensator, the axis of rotation (also the compensator slow-axis) is aligned substantially parallel to the LCoS fast-axis if the polar angle is adjusted to produce the same amount of retardance in the tilted −C-plate as in the LCoS A-plate. However, a high yield LCoS engine assembly will require setting the compensator on-axis retardance at a higher value than the LCoS A-plate retardance and relying on over-clocking of the relative azimuthal angles (LCoS and retarder) to optimize the image contrast performance. For those skilled in the art of retardance compensation, it is noted here that the axis of rotation for the tilted C-plate-only compensator is not required to be substantially aligned parallel or orthogonal to the fast axis of the LCoS panel. For a nominal LCoS fast axis of ±45°, with respect to the PBS P-plane, the slow-axis of the tilted −C-plate-only element (also the axis of rotation) can be 'over-clocked' away from the LCoS Fast-axis if the magnitude of the tilted C-plate on-axis net retardance is greater than the LCoS A-plate retardance. The over-clocking angle (i.e., azimuthal offset angle from the bisector of the S- and P-polarization axes) is given approximately by, $$\phi_{ob} \approx \cos^{-1}(\Gamma_{LC}/\Gamma_{TR})/2, \quad (4)$$

where $\Gamma_{LC}$ is the LCoS A-plate retardance; $\Gamma_{TR}$ is the on-axis retardance of the tilted C-plate element as seen by the principal ray; and $\Gamma_{TR} \geq \Gamma_{LC}$.

Figure 6:
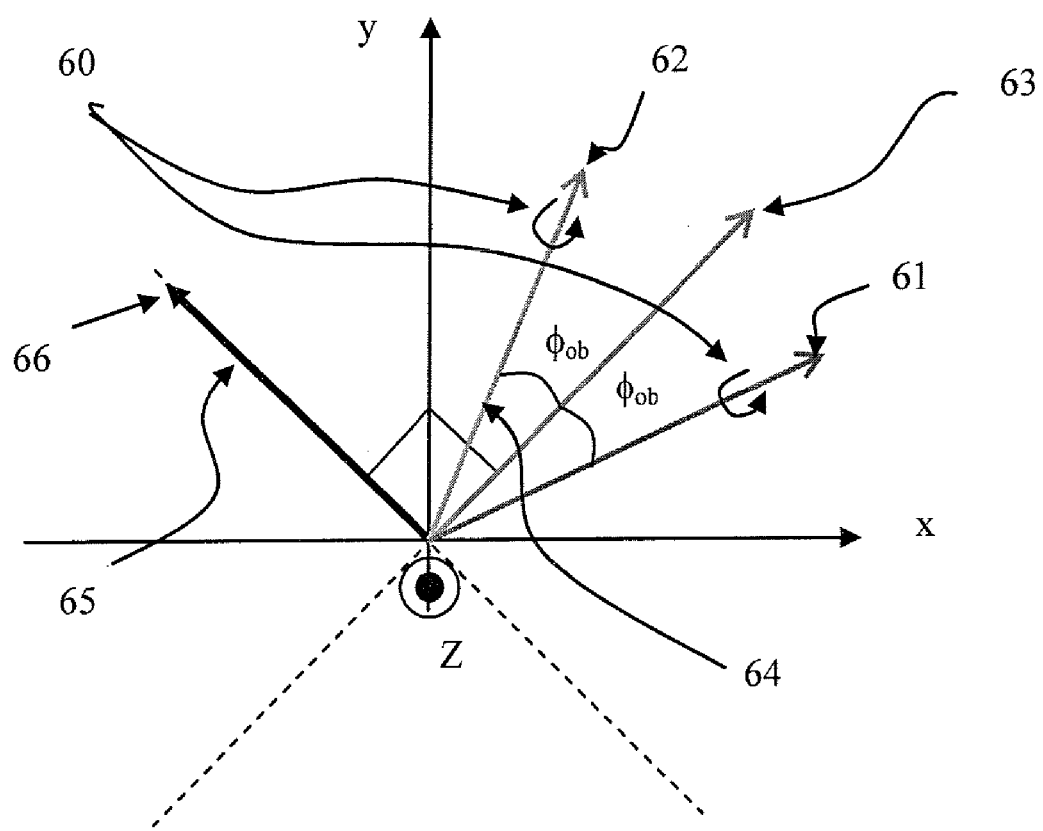
FIG. 6 shows the relative azimuthal angles between the LCoS fast/slow axes and axis of rotation for the tilted −C-plate, where tilted C-plate retarder compensator has an on-axis retardance greater than or equal to the LCoS A-plate retardance.

The relative azimuthal angles of this "over-value-compensation" scheme are illustrated in FIG. 6. "Over-value-compensation" refers to having a higher on-axis retardance 64 ($\Gamma_{TR}$) of the tilted −C-plate than the LCoS A-plate retardance 65 ($\Gamma_{LC}$); due to the relative azimuthal clocking, this compensation produces an overall net retardance ~0 for light traversing the two stages. In order to account for asymmetry features of LCoS imagers (such as distinguishing between the positive tilt and negative tilt of a VAN-mode LC layer and the entrance to exit twist span of the TN-mode LC layer), the slow-axis of the LCoS is uniquely defined over 0° to 360° circle. The example in FIG. 6 has the LCoS slow-axis 66 aligned at 135° azimuthal angle. In the nominal case, the tilted −C-plate is adjusted for a suitable polar angle tilt 60, where a matched C-plate retarder on-axis retardance and LCoS A-plate retardance is realized, the axis of rotation can be anchored at +45° azimuthal angle 63. For an "over-value-compensation" case, the polar angle tilt is made larger than the nominal case. The axis of rotation now deviates from the bisector of S- and P-polarization axis by $\phi_{ob}$, giving four local optima orientations, two of which are shown as 61 and 62. A better compensation result can be obtained by choosing the azimuthal offset, where the resultant compensator slow-axis is oriented nearer to the P-polarization than the S-polarization of the WGP.

Therefore, the "first optimal solution" 61 in FIG. 6 is preferred over "second optimal solution" 62. The solution space of arbitrary LCoS slow axis orientation over all four quadrants (specifically referring to the positive-tilt of the VAN-mode imager LC tilt) is given in Table 1. The LCoS slow axis is nominally aligned at the bisector of the S- and P-plane in the optical system with an azimuthal angle tolerance of δ, where δ can be ±20°, more preferably ±10° and still more preferably ±5°. This tolerance angle has a small impact on the predicted azimuthal offset by equation (4); it's a $\cos^2(2\delta)$ modification of LCoS A-plate retardance where the function is rather insensitive at small angles. For a given LCoS slow-axis alignment, the two preferred axis of rotation may not produce equal contrast results; one of the these two preferred solution may be best for pairing up with both cases +45° and −45° WGP tilt (in different color channels of the multiple-panel light engine).

TABLE 1

Orientation solution space of LCoS versus tilted −C-plate retarder compensator.

| LCoS orientation | | Tilted −C-plate orientation | | |
|---|---|---|---|---|
| Quadrant number | Approx. slow-axis, $\phi_{LC} \pm \delta$ | Quadrant number | Approx. axis of rotation: Preferred solution | Approx. axis of rotation: Secondary solution |
| 1 | 45° ± δ | 2 and 4 | 135° ≤ $\phi_{ax}$ < 180°, 315° ≤ $\phi_{ax}$ < 360° | 90° < $\phi_{ax}$ ≤ 135°, 270° < $\phi_{ax}$ ≤ 315° |
| 2 | 135° ± δ | 1 and 3 | 0° < $\phi_{ax}$ ≤ 45°, 180° < $\phi_{ax}$ ≤ 225° | 45° ≤ $\phi_{ax}$ < 90°, 225° ≤ $\phi_{ax}$ < 270° |
| 3 | 225° ± δ | 2 and 4 | 135° ≤ $\phi_{ax}$ ≤ 180°, 315° ≤ $\phi_{ax}$ ≤ 360° | 90° < $\phi_{ax}$ ≤ 135°, 270° < $\phi_{ax}$ ≤ 315° |
| 4 | 315°° ± δ | 1 and 3 | 0° < $\phi_{ax}$ ≤ 45°, 180° < $\phi_{ax}$ ≤ 225° | 45° ≤ $\phi_{ax}$ < 90°, 225° ≤ $\phi_{ax}$ < 270° |

Conversely, for an LCoS panel with its fast/slow axes aligned with a small azimuth offset from the ±45° direction, the axis of rotation of the tilted −C-plate compensator may be fixed at ±45°, in the same quadrant as the fast axis of the LCoS element, provided that the tilt angle is controlled such that a smaller on-axis retardance is produced by the tilt, relative to the A-plate retardance of the LCoS panel. This is term "under-value-compensation" scheme; due to the relative azimuthal clocking, the compensation produces an overall net retardance near zero for light traversing the two stages.

Figure 7:
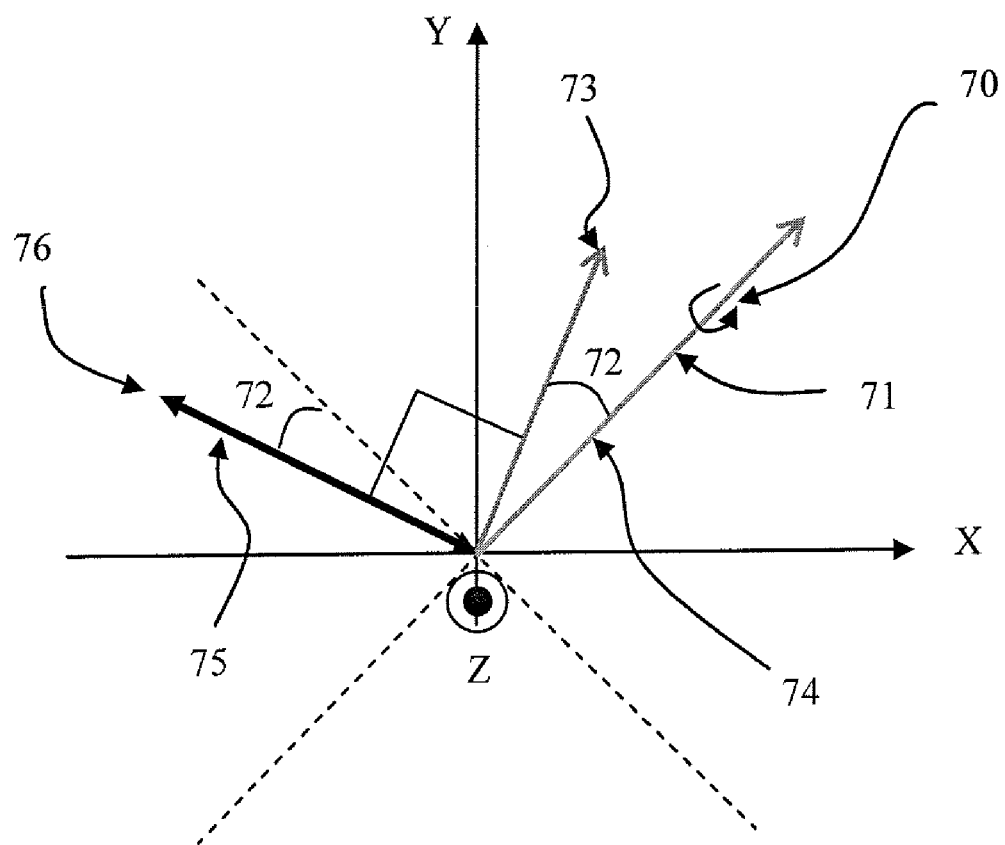
FIG. 7 shows the relative azimuthal angles between the LCoS fast/slow axes and axis of rotation for the tilted −C-plate, where tilted C-plate retarder compensator has an on-axis retardance smaller than the LCoS A-plate retardance.

The relative azimuthal angles of this compensation scheme are illustrated in FIG. 7. In essence, the residual retardance FLC of the LCoS panel 75 is used to compensate for the −C-plate on-axis retardance $\Gamma_{TR}$ 74. The LCoS slow axis 76 and fast axis 73 are typically very close to the ±45° azimuth with respect to the PBS P-plane, for an effective electrically controlled birefringence (ECB) LC device has to be created by driving a voltage through the LCoS cell in gray states. However, the LCoS fabrication process often results in a small deviation 72 ($\phi_{ob}$) of the slow/fast axes from the ideal 'S' and 'P' bisector alignment (say, up to ±10°). It is because of this azimuthal deviation 72 that the role of the "compensator" and the "compensated" device can be reversed. The out-of-plane tilting 70 of the −C-plate retarder is effected about a rotation axis 71, aligned substantially bisecting the S- and P-planes. In the case of introducing a tilted −C plate into an LCoS system, the tilt angle can be reduced due to the smaller on-axis retardance requirement. This can result in some space saving as well as reduced image quality impairment due to the use of a tilted optical element. The on-axis retardance of the tilted −C-plate is related to the LCoS axis offset and LCoS A-plate retardance by the following approximate expression, $$\phi_{ob} \approx \cos^{-1}(\Gamma_{TR}/\Gamma_{LC})/2, \quad (5)$$

where $\Gamma_{TR}$ and $\Gamma_{LC}$ are as defined before but, $\Gamma_{TR} < \Gamma_{LC}$.

The birefringent compensator may also be a +C-plate retarder, whose rotational axis for effecting the tilt would then be oriented substantially parallel to the slow axis of the panel, in the case of matched-value compensation. This is because the axis of rotation becomes the fast-axis of the tilted +C-plate retarder. In general, the axis of rotation for +C-plate is nearer to the S-polarization than to the P-polarization in order that the resultant slow-axis of the tilted +C-plate is aligned closer to the P-plane of WGP. The general cases of over-value-compensation with a +C-plate retarder at a tilt angle are listed in Table 2. Again, the two preferred solutions may not produce equal contrast results, one of which may be better than the other depending on the alignment of the WGP. The scenario of under-value-compensation is not shown here for using a +C-plate retarder compensator. In general the axis of rotation and the LCoS slow-axis are oriented in the same quadrant.

TABLE 2

Orientation solution space of LCoS versus tilted +C-plate retarder compensator.

| LCoS orientation | | Tilted +C-plate orientation | |
|---|---|---|---|
| Quadrant number | Approx. slow-axis, $\phi_{LC} \pm \delta$ | Quadrant number | Approx. axis of rotation: Preferred solution | Approx. axis of rotation: Secondary solution |
| 1 | 45° ± δ | 1 and 3 | 45° ≤ $\phi_{ax}$ < 90°, 225° ≤ $\phi_{ax}$ < 270° | 0° < $\phi_{ax}$ ≤ 45°, 180° < $\phi_{ax}$ ≤ 225° |
| 2 | 135° ± δ | 2 and 4 | 90° < $\phi_{ax}$ ≤ 135°, 270° < $\phi_{ax}$ ≤ 315° | 135° ≤ $\phi_{ax}$ < 180°, 315° ≤ $\phi_{ax}$ < 360° |
| 3 | 225° ± δ | 1 and 3 | 45° ≤ $\phi_{ax}$ < 90°, 225° ≤ $\phi_{ax}$ < 270° | 0° < $\phi_{ax}$ ≤ 45°, 180° < $\phi_{ax}$ ≤ 225° |
| 4 | 315° ± δ | 2 and 4 | 90° < $\phi_{ax}$ ≤ 135°, 270° < $\phi_{ax}$ ≤ 315° | 135° ≤ $\phi_{ax}$ < 180°, 315° ≤ $\phi_{ax}$ < 360° |

In the preferred embodiment, the C-plate retarder is made with form birefringent anti-reflection (FBAR) coatings on a transparent substrate. The dielectric coated −C-plates utilize a series of alternating thin layers of two or more different index materials and the resultant dielectric stack produces low reflectance as required by reflection geometry of an LCoS engine.

Figure 8:
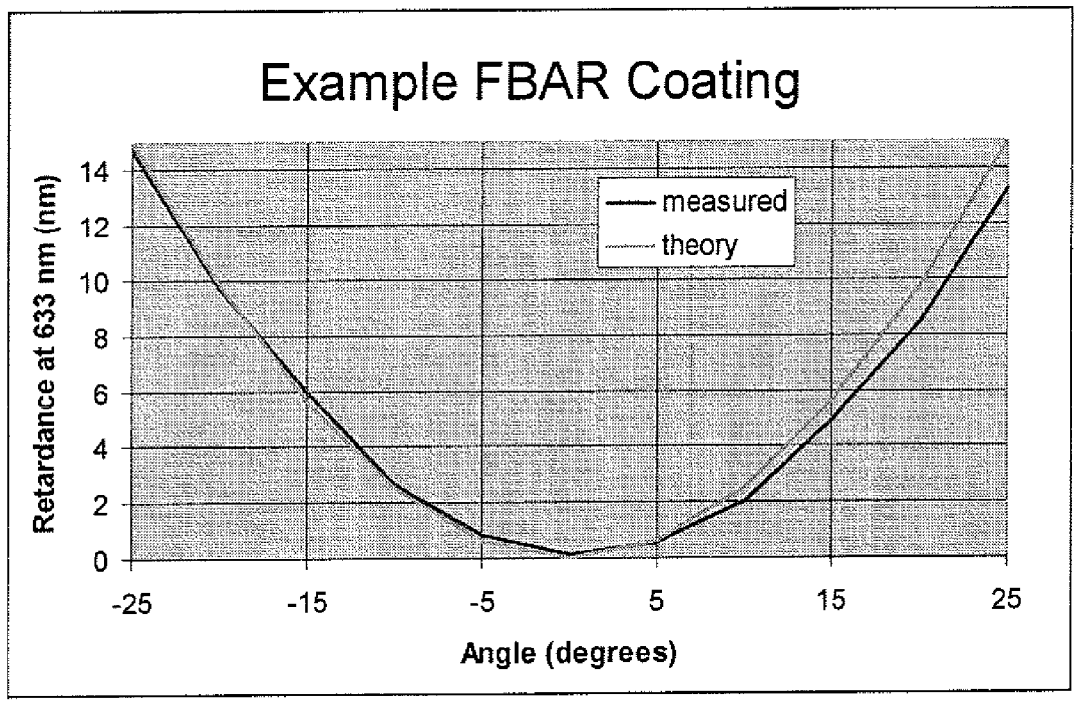
FIG. 8 is a graph of the measured and design net retardance of a dielectric −C-plate retarder at a range of angles of incidence in air.

An example of the net retardance achievable by a dielectric form birefringent coating is shown in the FIG. 8. At 10° angle of incidence (AOI), or equivalently, the polar tilt angle $\theta_t$ of the −C-plate retarder compensator, approximately 2 nm on-axis retardance can be obtained to compensate for an LCoS display. There is good agreement between the theoretical retardance profiles and experimental measurements of C-plate retarders. The retardance profiles, and hence the required net retardance at a given tilt angle, can be tailored arbitrarily by dielectric design.

Figure 9:
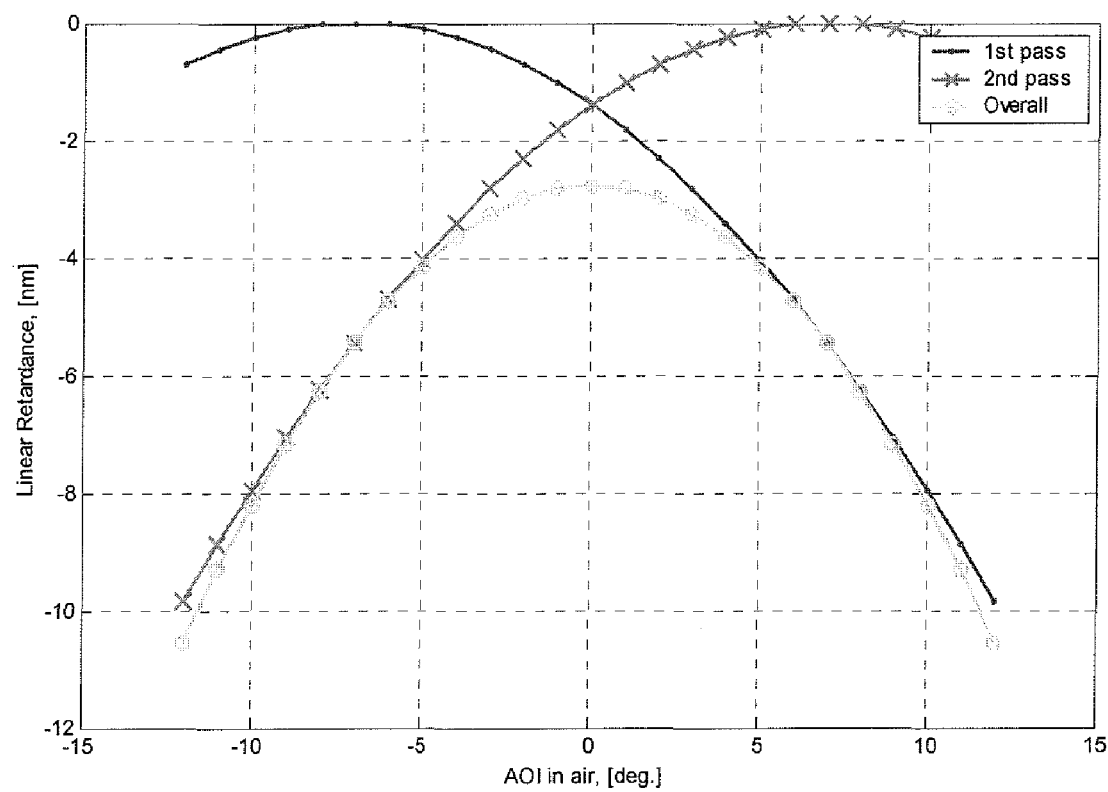
FIG. 9 is a graph of the calculated first, second and overall double-pass net retardance along the tilt-plane of a tilted −C-plate element.

The on-axis and off-axis net retardance of the tilted −C-plate is realized as illustrated in FIG. 9. The "D55" FBAR design targeted a C-plate retardance of −110 nm at λ=633 nm. The simulation assumes that this −C-plate retarder is mounted at 7° off-normal geometry. The principal ray at λ=633 nm is incident at 7° polar angle and it sees an approximately 1.4 nm single-pass net retardance. The net retardance for the principal ray doubles on second pass. For positive AOI rays, the first pass incidences are impinged on the tilted plate at a higher AOI than the tilt angle and the net retardance magnitude is considerable larger than the net retardance of the principal ray. Upon reflection off the LCoS panel, these rays are folded to the opposite azimuth of the tilted −C-plate such that the second pass AOI and hence the net retardance values are reduced versus the first pass. Similar double-pass folding occurs for negative AOI rays in the first pass. The result is a self-mirrored, symmetric retardance profile, with respect to the axis of rotation.

The plot in FIG. 9 shows the net retardance profile along a single plane of incidence (corresponding to plane of tilt of −C-plate retarder). Over the entire viewing cone (e.g., f/2.4 LCoS system in air, at up to ±12° AOI versus LCoS device normal), the net retardance of the LCoS device changes as a function of the polar and azimuthal viewing angles. The associated slow/fast axes also vary as a function of the viewing angles. However, the tilted −C-plate, designed with an appropriate −C retardance and tilted suitably to induce an appropriate amount of on-axis retardance, matches the LCoS net retardance for every ray angle. The slow-axis of the double-passed tilted −C-plate is substantially orthogonal to the slow axis of the LCoS device.

Figure 10A:
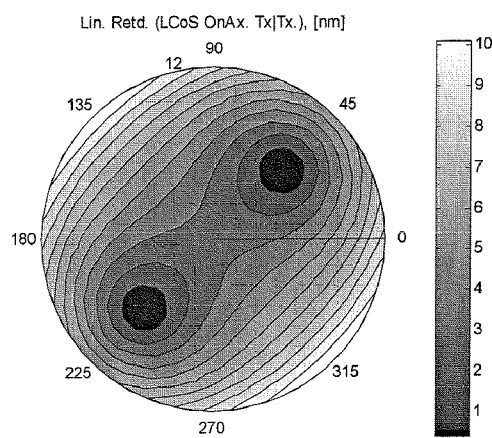
FIGS. 10a & b are a contour plot of the calculated conoscopic net retardance and slow axis maps of a vertically-aligned nematic (VAN) LCoS, where the LCoS A- and C-plate retardance values are 1.4 and 250 nm @λ=633 nm, respectively.
Figure 10:
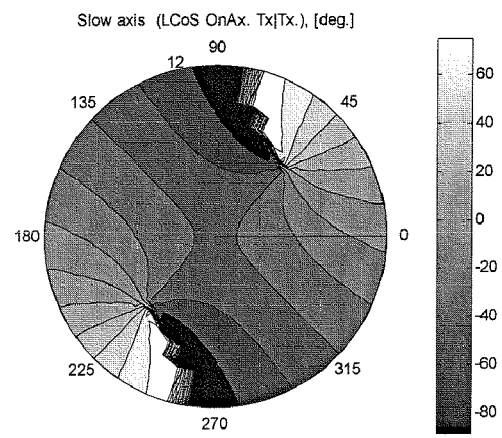
Figure 11A:
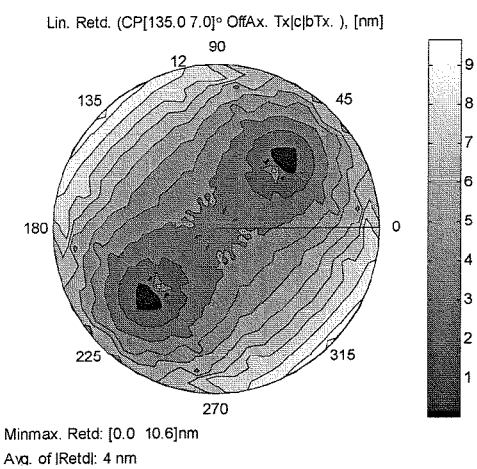
FIGS. 11a & b are a contour plot of the calculated conoscopic net retardance and slow axis maps of a −110 nm C-plate-only retarder, tilted at 7 deg about 45 deg. axis of rotation.
Figure 11B:
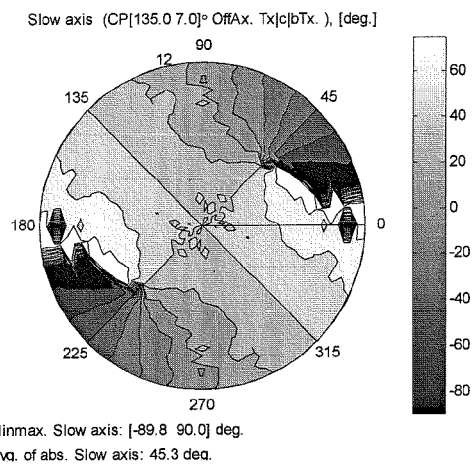
Figure 12:
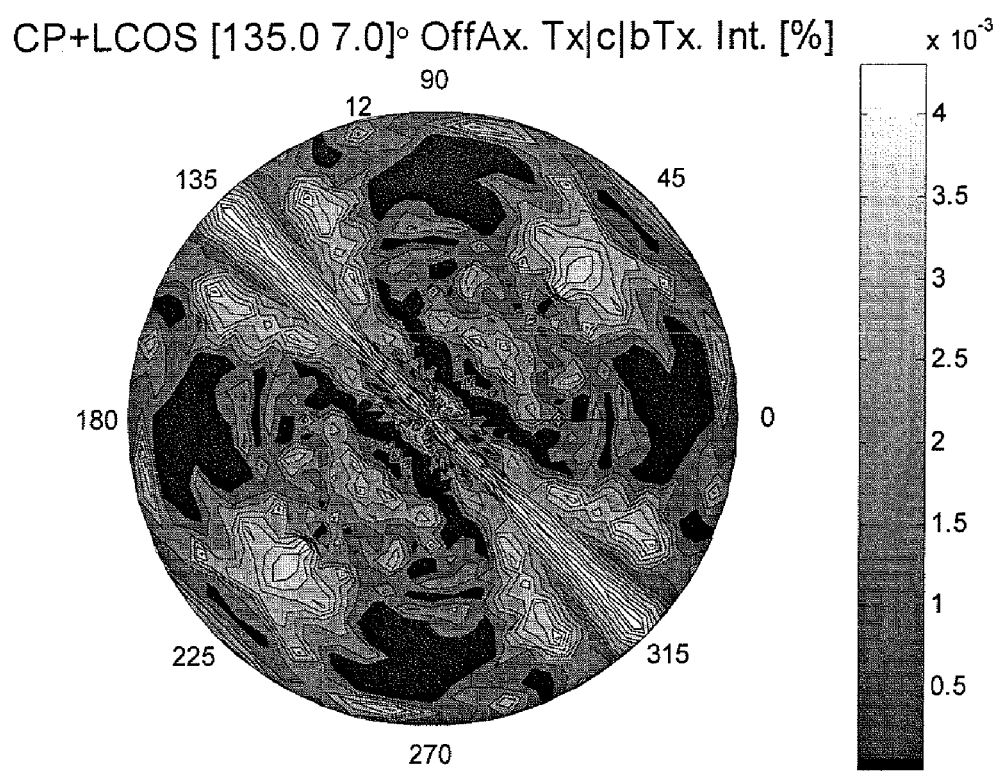
FIG. 12 is a contour plot of the simulated double-pass leakage intensity of cascading a tilted FBAR −C-plate to at 7° tilt, about an axis of rotation at 135° and a VAN-mode LCoS panel.

FIG. 10 shows the simulated double-pass net retardance in (a) and slow-axis orientation in (b) of an LCoS model having a 1.4 nm A-plate retardance and 250 nm C-plate retardance at $\lambda$=633 nm. The slow-axis at normal incidence ray is orientated at approx. −45° w.r.t. reflection viewing (as shown in FIG. 10(b) or +45° w.r.t. transmission viewing). This means that the axis of rotation for the FBAR −C-plate, which is also its slow-axis w.r.t. to the principal ray, has to be aligned at 135° w.r.t. transmission viewing in RH-XYZ coordinate set. This applies for the nominal case of matched-value compensation. The corresponding net retardance and the retarder slow axis orientations of the 7° tilted FBAR −C-plate are shown in FIG. 11(a) and (b), respectively. The fuzziness in the plots are an artifact of sampling the viewing cone one plane of incidence at a time and converting the data to a rectangle sample grid for plotting and cone-weighted contrast computation. Note that the retardance profile of the tilted FBAR −C-plate matches that of LCoS closely. The slow-orientation of the FBAR −C-plate has a nominal 45° w.r.t. reflection viewing (as shown in FIG. 11(b) or −45° w.r.t. transmission viewing). This means that every ray in the entire cone is alternately delayed more then less, or v.v. in the retarder compensator and the LCoS stages, regardless of the amount of retardance. The resultant LCoS panel dark state is excellent. The dark state leakage intensity through a set of crossed polarizer in full reflection double-pass is given in FIG. 12. A raw double-pass contrast of ~80,000:1 was modeled. The reflection of the entire structure was also very low. However, with the trim retarder compensator aligned at a tilt, only a portion of the stray reflected light is captured by the finite system numerical aperture. By assuming a baseline optical system contrast of 6,000:1, this combination of a tilted −C-plate and a VAN-mode LCoS gives about 5,300:1 full-on to full-off contrast ratio.

The C-plate-only compensator is tilted at an angle with respect to the LCoS panel. The tilt of the plate introduces net retardance, as seen by the principal ray, in an amount which corrects for the residual A-plate retardance of the LCoS panel. The form birefringent coating on the −C-plate still provides for appropriate C-plate correction for the off-axis performance. This arrangement allows a single −C-plate-only component to provide for both on-axis and off-axis LCoS retardance compensation to achieve a high contrast image.

Figure 13:
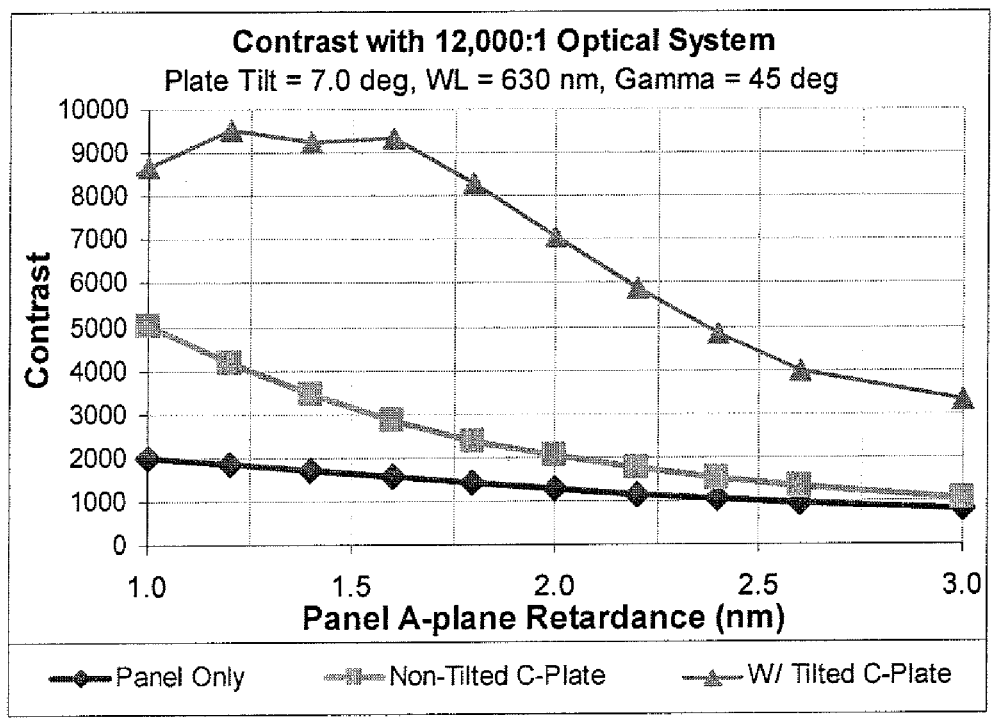
FIG. 13 is a plot of the simulated contrast performance of a 7° tilted FBAR −C-plate and a non-tilted FBAR −C-plate for a range of LCoS A-plate retardance values. The LCoS slow-axis is oriented at an azimuthal angle γ=135° and the FBAR plate is rotated about γ=45° azimuth.

Theoretical modeling and empirical measurements have confirmed that this configuration results in high contrast. The plot shown in FIG. 13 is the theoretical calculation which shows expected contrast ratio as a function of display panel A-plane retardance. While non-tilted C-plate compensation is adequate for very small LCoS A-plate retardance (e.g. <0.5 nm), the calculated results show that a significant increase in contrast can be obtained by aligning the C-plat at a tilt for common LCoS A-plate retardance values (up to 2 nm). In this model, the rotational axis is fixed at 45°, and the tilt angle is also fixed at 7° out of plane. The −C-plate FBAR coating design has −110 nm C-plate retardance at 630 nm wavelength. The on-axis retardance at 7° tilt is approximately 1.4 nm. Consequently, only LCoS panels with residual A-plate retardance ~1.4 nm are compensated exactly. However it can be seen from the analysis that a large range of panel retardance can be compensated significantly with a single compensator at a fixed tilt angle.

For panels with much higher or lower A-plate retardance (e.g. greater than 2.5 nm or less than 0.5 nm), either the tilt has to be adjusted, the axis of rotation has to be varied, the value of the −C-plate has to be adjusted, or a combination of all three. One skilled in the art will realize that that a fixed value compensator plate can be tuned to match panel retardance by either tilting the compensator plate and/or by rotation (i.e., clocking) when the net retardance of the −C-plate over-compensates the A-plate retardance of the LC device.

Figure 14:
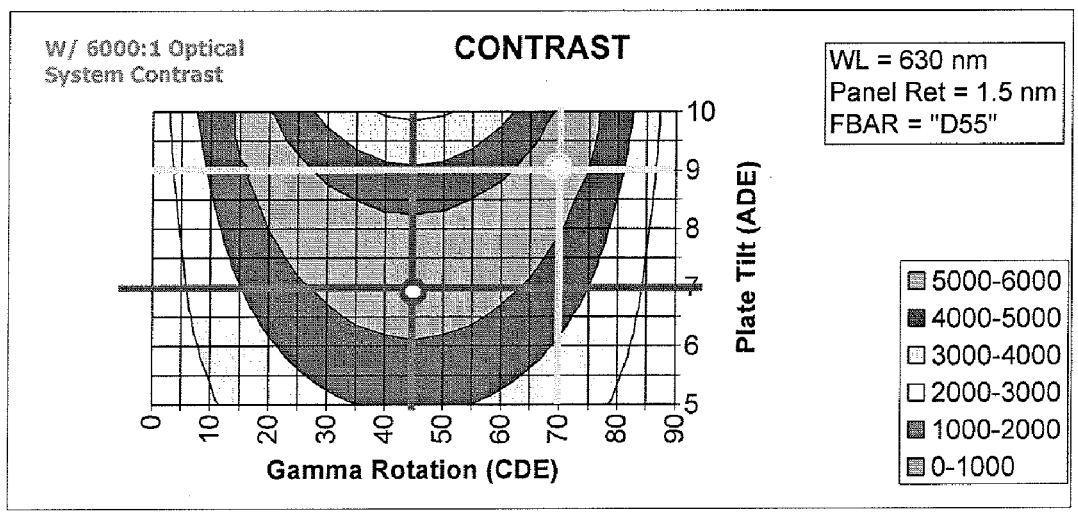
FIGS. 14 is a contour plot of the simulated tolerance of a tilted FBAR −C-plate with the variation of axis of rotation and the polar angle tilt.

The numerical tolerance results of pairing an FBAR −C-plate at a slight tilt to an VAN-mode LCoS are given in FIG. 14. The figure shows the contrast variations as a function of −C-plate compensator out-of-plane tilt and axis of rotation change. Over-value compensation of LCoS panels can be optimized at a fixed tilt angle by adjusting the rotation of the plate. In this LCoS and FBAR design example, high contrast can be achieved with the plate tilt at 7° and rotation at 45° (aligned with fast axis of LCoS panel). High contrast can also be achieved at a 9° plate tilt with a ±25° rotation from parallel alignment with the LCoS fast axis. In actual optical system where a WGP is utilized, the optimal rotation axis at approx. 20° is likely to give better contrast.

In the numerical models conducted here, the WGP-PBS is modeled as a leaky polarizer with about 450:1 transmitted polarization contrast and 30:1 reflected polarization contrast. The pre-polarizer and clean-up analyzer are modeled as 1000:1 polarization contrast elements used at normal incidence to the cone axis. Under these ideal conditions, there is negligible difference between the contrast numbers at each of the four local contrast maxima (two orientations of the tilted C-plate axis of rotation located in each of the two neighboring quadrants) for a given LCoS slow-axis alignment. In the actual optical systems, the WGP is either aligned at −45° or +45° w.r.t. Z-axis and the WGP is a diffractive element with parasitic retardance properties in addition to its primary diattenuation function. A quick way to verify the optimal alignment of the axis of rotation of the tilted C-plate is to collect contrast data experimentally.

All the azimuthal angles used here (experimental and numerical model) are referenced to the RH-XYZ coordinate system. When a device model is specified, the RH-XYZ coordinate system is referenced to the incidence; when viewing the transmitted field, RH-XYZ coordinate system is referenced to the transmitted beam; when viewing the reflected or double-pass transmission field, the RH-XYZ coordinate system is referenced to the returned beam. As a consequence of this convention, the coordinate sets in the transmitted and incident sides are consistent to each other but the coordinate set in the reflected side has a left-right mirror property versus the incident coordinate set. In the description of elliptical polarizer and retarder, the sign of circular eigenpolarization is used consistently in the incident, transmitted and reflected sides.

Figure 18A:
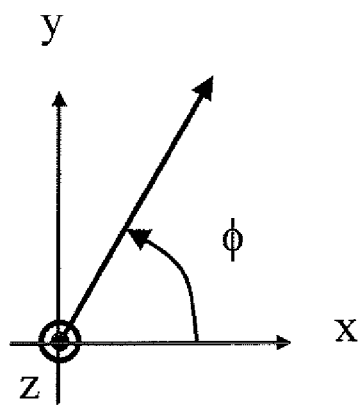
FIG. 18(a) defines the right-handed XYZ coordinate system, when viewing the beam coming to the observer, along with Counter-clockwise (CCW) convention for positive azimuthal angles (termed "RH-XYZ"), while FIG. 18(b) defines the left-handed XYZ coordinate system, when viewing the beam away from the observer, along with counter-clockwise (CCW) convention for positive azimuthal angles (termed "LH-XYZ").
Figure 18B:
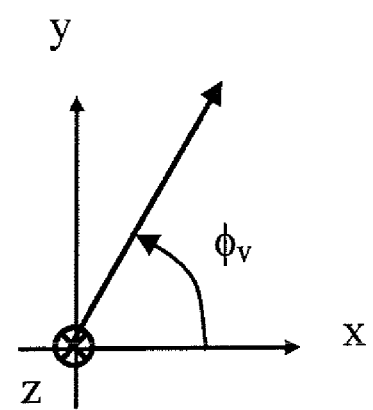
Figure 19A:
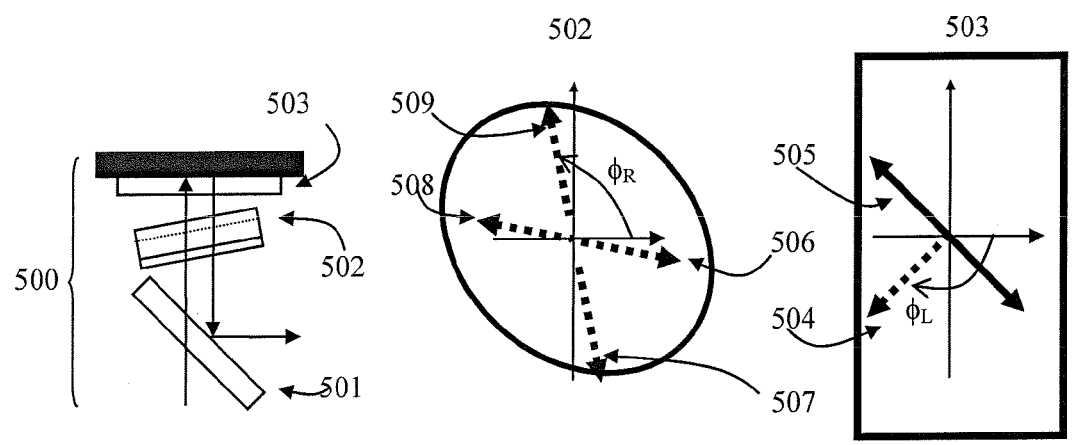
FIGS. 19a-d are a schematic diagram showing the relative alignment of trim retarder slow axis at each local contrast maximum and the fast/slow axes of for different panel orientations with the WGP tilted at −45°.
Figure 19B:
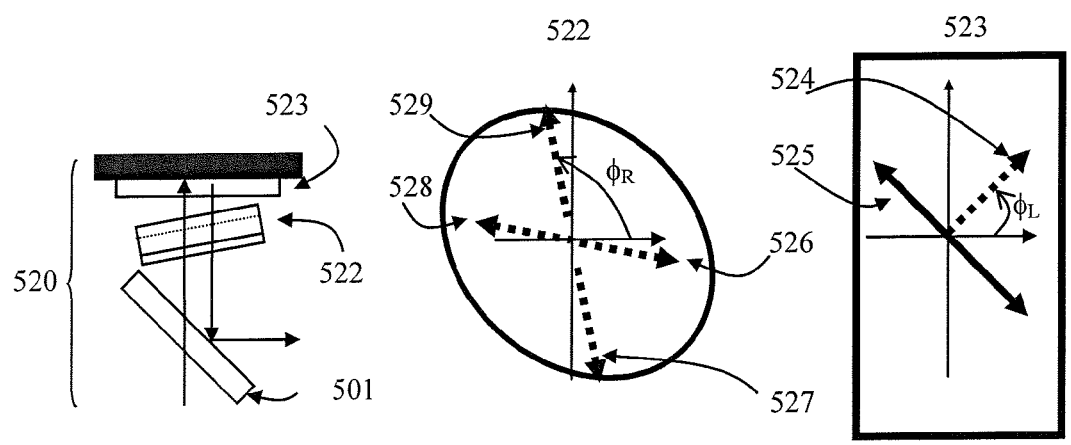
Figure 19C:
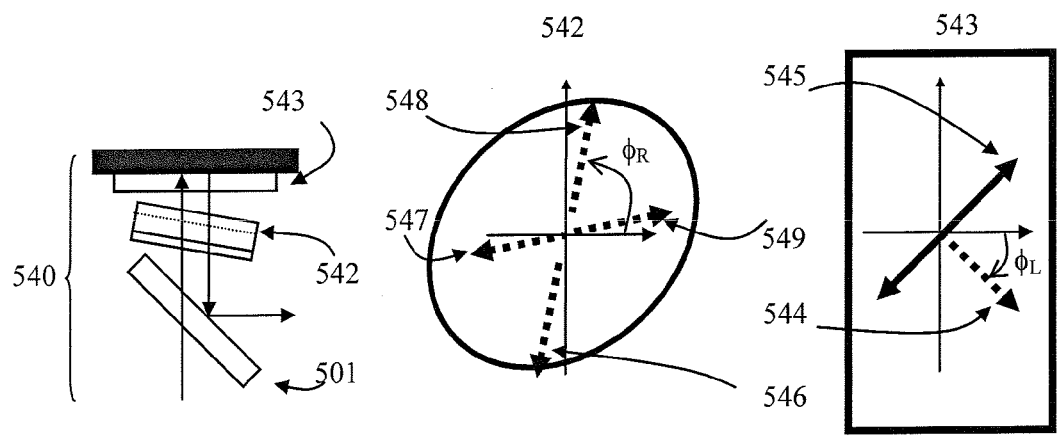
Figure 19D:
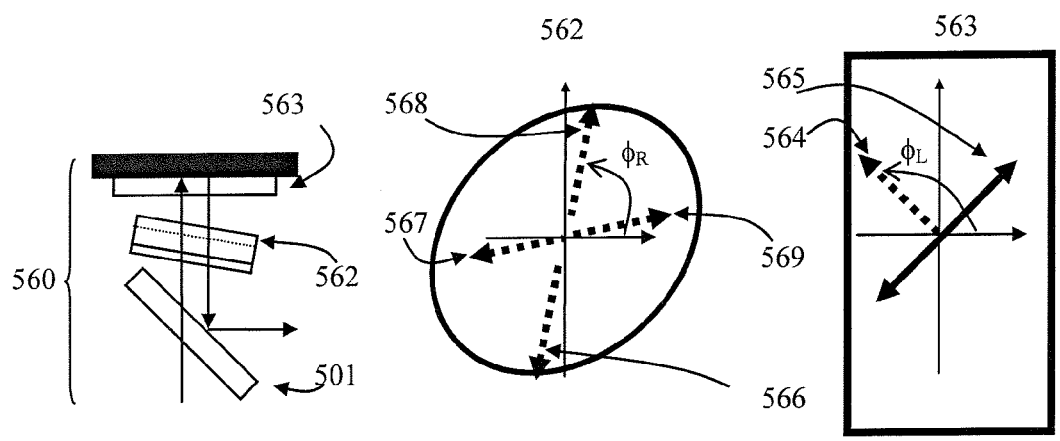
Figure 20A:
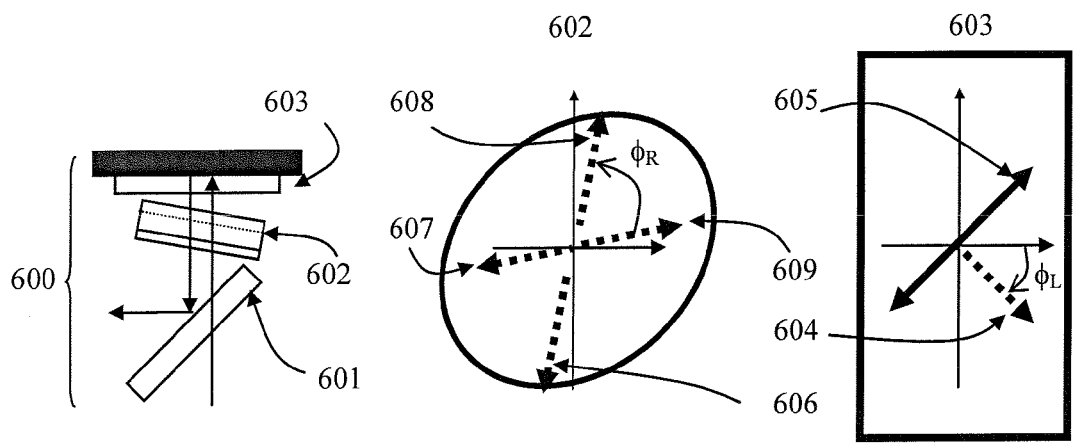
FIGS. 20a-d are a schematic diagram showing the relative alignment of trim retarder slow axis at each local contrast maximum and the fast/slow axes of for different panel orientations with the WGP tilted at +45°.
Figure 20B:
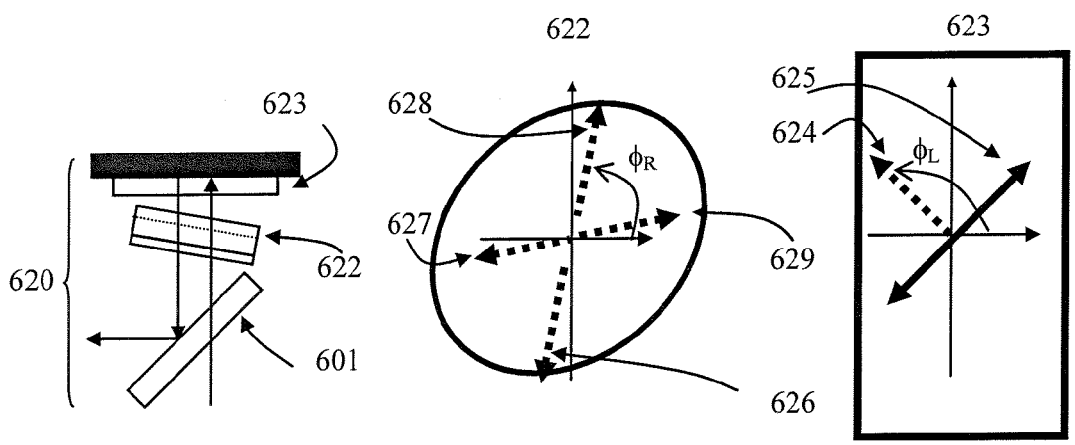
Figure 20C:
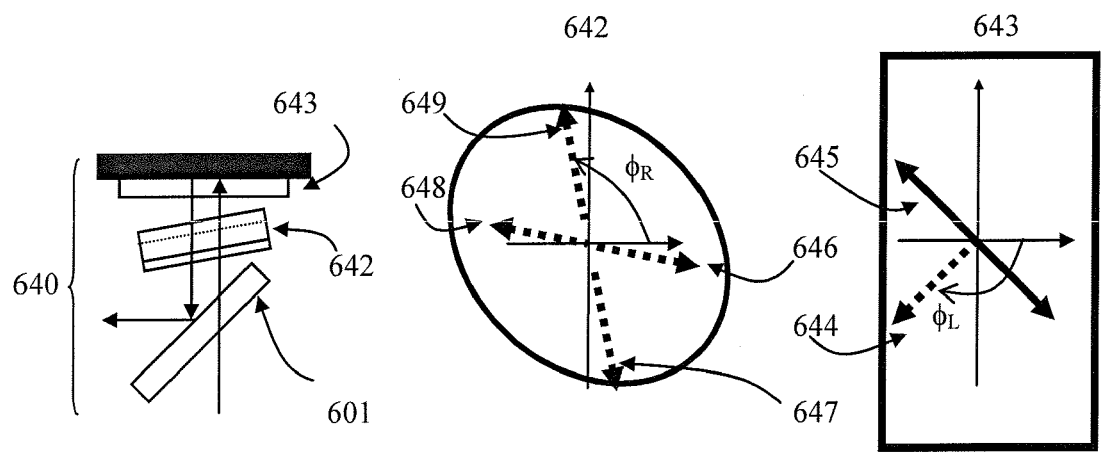
Figure 20D:
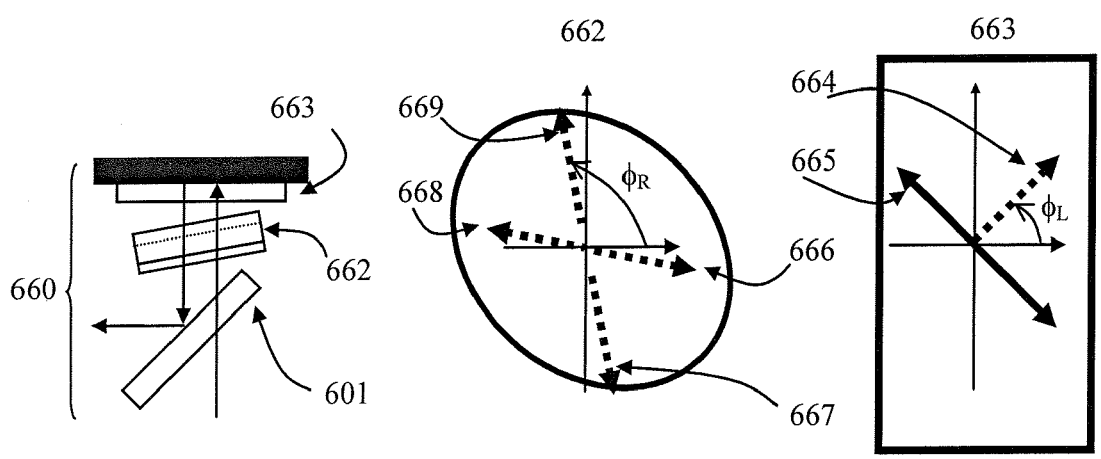

The RH-XYZ coordinate system is shown in FIG. 18(a). The coordinate axes represent the RH-XYZ when specifying the Euler angles (two angles for uniaxial medium and three angles for biaxial medium) w.r.t. to viewing the incident beam head-on. Throughout this document, polar and azimuthal angles of each uniaxial layer are represented by ($\theta_c$, $\phi_c$). When a reflective (or double-pass transmission) device is viewed from the input side, the RH-XYZ system is maintained by reversing the direction of the X-axis. The RH-XYZ coordinate set for reflection viewing is equivalent to a LH-XYZ coordinate set as referenced to the incident beam (i.e., viewing the back of the incidence). This is shown in FIG. 18(b). In both RH-XYZ and LH-XYZ coordinate systems (global definition, as they are both referenced to the incidence); the azimuthal angle is defined positive for Counter Clockwise (CCW) rotation from the positive X-axis. This axis orientation is used for example to describe the fast/slow axes of a retarder. For specifying the viewing plane in a cone of light, the transmitted viewing plane is aligned to the plane of incidence. However, for a reflective (or double-pass transmission) system, the viewing plane has a 180° offset from the plane of incidence (for a 360° azimuthal plane range and a 0 to 90° polar angle range).

With the conventions for XYZ coordinate system established, all possible configurations of the tilted −C-plate retarder compensator and LCoS orientations are represented in FIG. 19(a)-(d) for the case of the WGP being oriented at −45° w.r.t. Z-axis. The optical system configurations are named 500, 520, 540 and 560. These correspond to the LCoS SA being oriented at quadrant 3 (504), 1 (524), 4 (544) and 2 (564), respectively, as referenced to LH-XYZ coordinate system. The SA orientations of the panels are assumed substantially bisecting the system S- and P-polarization directions (for example within ±10° of bisector). The SA of the tilted −C-plate corresponds to the axis of rotation to effect the out-of-plane tilt. This axis lies in the plane of X-Y.

Similarly, when the WGP is oriented at +45° w.r.t. z-axis, four possible LCoS panel SA orientations, along with 16 possible tilted −C-plate SA orientations are shown in FIG. 20(a)-(d). Configurations 600, 620, 640 and 660 are mirror images (about the y-axis) of configurations 500, 520, 540 and 560, respectively. The LCoS panel SA orientations of configurations 600, 620, 640 and 660 are located at quadrants 4 (604), 2 (624), 3 (644) and 1 (664), respectively. Not although a LH-XYZ coordinate system with CCW positive azimuthal angle convention has been adopted for depicting the orientations of the tilted −C-plate and LCoS Slow Axes, the orientations as indicated actually mean that the optic-axis of LCoS device is tilted towards the +Z direction, w.r.t. RH-XYZ coordinate system. The tilt-plane of the tilted −C-plate retarder compensator is at a further 90° CCW from the axis of rotation and this tilt plane leans forward to the +Z axis.

The system contrast performance at each of the four possible tilted −C-plate orientations has been experimentally evaluated at each given LCoS SA orientation (out of four) and at each WGP orientation (out of two). The experiments used a f/2.4 convergent cone of light. There are 32 possible configurations involving the orientations of three elements (WGP, tilted −C-plate and LCoS). In these experiments, we made use of the mirror properties of configurations 500s and 600s and eliminated 16 non-unique configurations. The green wavelength band, centered at $\lambda=550$ nm, has been chosen. We expect the relative dependence of contrast ratio on tilted −C-plate orientation is approximately similar in each of the three color bands (possibly slightly worse in the blue band).

Figure 21:
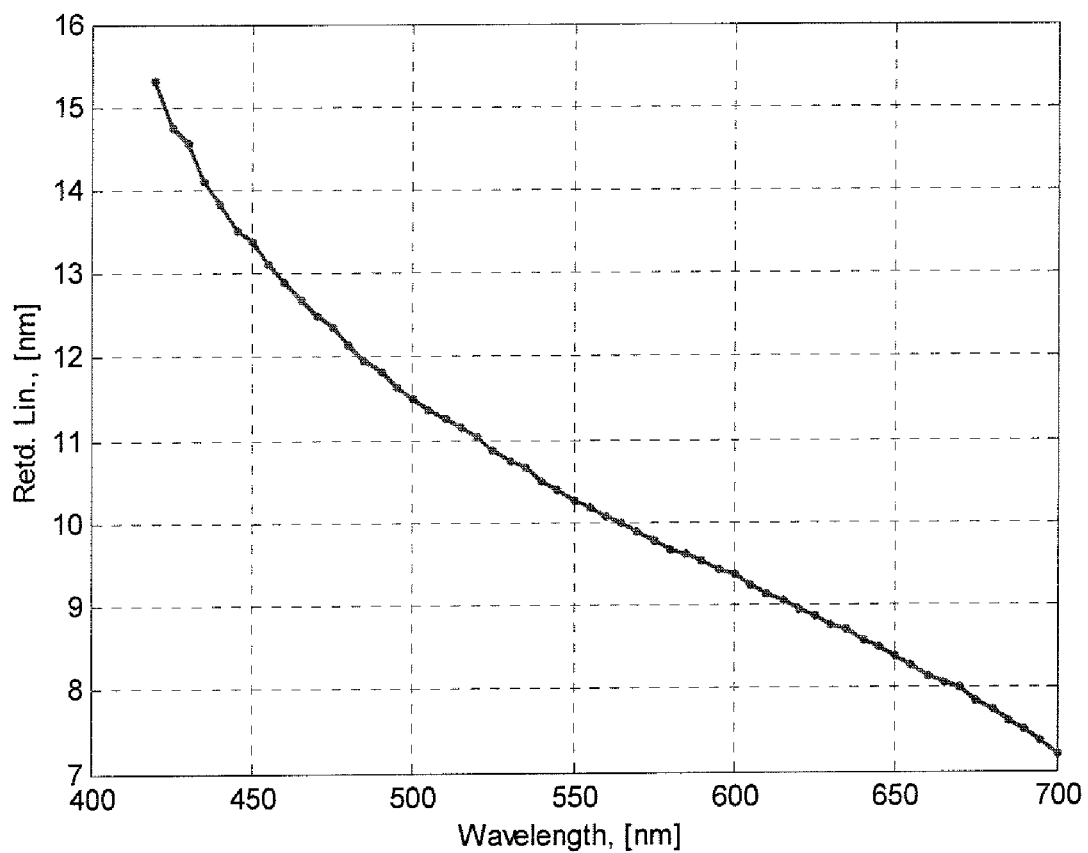
FIG. 21 is a graph of an experimental net retardance spectrum of a −C-plate retarder tilted at approximately 20° with respect to the principal ray.
Figure 22:
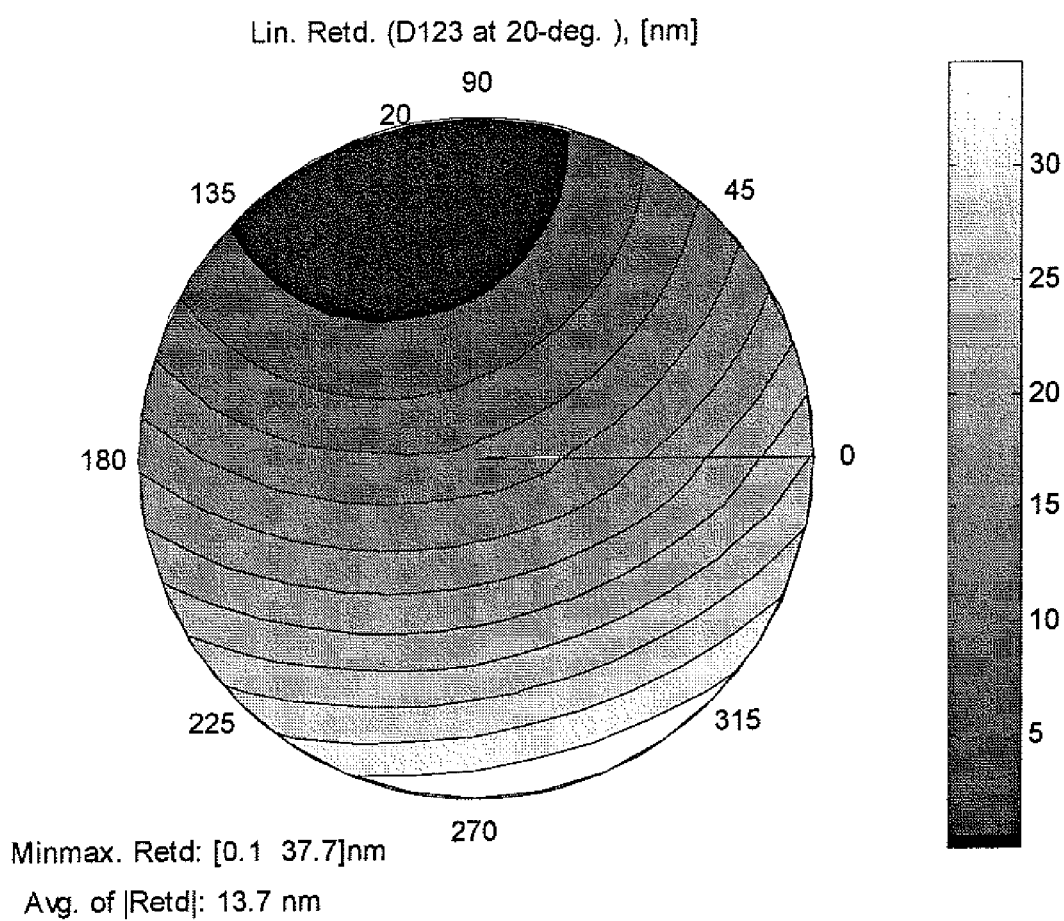
FIG. 22 is a contour plot of an experimental net retardance map of a −C-plate retarder tilted at approximately 20° with respect to the X-Y plane. The axis of rotation in effecting the out-of-plane tilt and the resultant slow-axis of the tilted −C-plate retarder is oriented at approximately 20° CCW in a RH-XYZ coordinate system. The convergent viewing cone extends to ±20° polar angles along all azimuthal planes.

The VAN-mode LCoS used in these experiments had about 2 nm of A-plate and 250 nm of C-plate retardance at $\lambda=550$ nm. The −C-plate retarder was tilted at about 20° polar angle. The design targets −195 nm C-plate retardance single-pass. The net retardance at ~20° tilt is about 10.5 nm at $\lambda=550$ nm. The net retardance dispersion is shown in FIG. 21. The single-pass net retardance map at a cone of up to 20°, over 0 to 360° viewing planes is illustrated in FIG. 22. The experimental contrast results have been collected with a PR-705 radiometer. The intensities at light-off and light-on states are weighted photopically in the green color band ($\lambda=490$ to 620 nm). These results are listed in Table 3 for configurations 500, 520, 540 and 560. The experimental results for configurations 600, 620, 640 and 660 are derived from configurations 500s, taking into account the symmetry in the optical setup. These contrast results are tabulated in Table 4. The corresponding panel contrast ratios without the trim retarder compensator range from 1200:1 to 2300:1 in the Green color channel for optical configurations 500s and 600s.

TABLE 3

Experimental Contrast measurement results in the green-band for optical configurations in series 500s.

| Configuration 500 | | Configuration 520 | | Configuration 540 | | Configuration 560 | |
| --- | --- | --- | --- | --- | --- | --- | --- |
| Tilted −C-plate SA | Contrast ratio | Tilted −C-plate SA | Contrast ratio | Tilted −C-plate SA | Contrast ratio | Tilted −C-plate SA | Contrast ratio |
| 506 | 5300 | 526 | 5600 | 546 | 6800 | 566 | 5100 |
| 507 | 6400 | 527 | 7800 | 547 | 5700 | 567 | 4700 |
| 508 | 6200 | 528 | 5000 | 548 | 3400 | 568 | 3500 |
| 509 | 4400 | 529 | 3200 | 549 | 4300 | 569 | 4900 |

TABLE 4

Experimental Contrast measurement results in the green-band for optical configurations in series 600s.

| Configuration 600 | | Configuration 620 | | Configuration 640 | | Configuration 660 | |
| --- | --- | --- | --- | --- | --- | --- | --- |
| Tilted −C-plate SA | Contrast ratio | Tilted −C-plate SA | Contrast ratio | Tilted −C-plate SA | Contrast ratio | Tilted −C-plate SA | Contrast ratio |
| 606 | 3500 | 626 | 3400 | 646 | 5000 | 666 | 6200 |
| 607 | 4900 | 627 | 4300 | 647 | 3200 | 667 | 4400 |
| 608 | 5100 | 628 | 6800 | 648 | 5600 | 668 | 5300 |
| 609 | 4700 | 629 | 5700 | 649 | 7800 | 669 | 6400 |

Depending on how the multiple-panel LCoS display system is configured, optimal picking of any one or more of the four solutions of tilted –C-plate slow-axis entails. As an example, the display system vendor intends to keep the flexibility of aligning to both orientations of the WGP in each color band and there is only one LCoS slow-axis selected. In this scenario, the axis of rotation for the tilted –C-plate retarder is optimal when it is aligned closest to the P-polarization axis. The slow-axis of the retarder compensator is substantially parallel to the P-pol. axis for a large mismatch of retarder net retardance and the LCoS A-plate retardance, both referenced to the principal ray. The difference in contrast performance for each of the two WGP shemes is minimized this way. The optimal alignment space for the axis of rotation for the tilted –C-plate within ⅛ of circle in each local optima is listed in Table 5 for all eight optical configurations grouped into four categories depending on the LCoS SA orientation.

TABLE 5

Azimuthal angle range for optimal compensation of a VAN-LCoS panel cascaded with an tilted –C-plate retarder compensator, where each azimuthal angle range is nearly 45° extended from the closest P-polarization axis. A nominal 0.1 degree offset from the S- and P-polarization bisector has been quoted.

| Configuration | Tilted –C-plate SA [$\phi_R$] | LCoS SA [$\phi_L$] |
|---|---|---|
| 500 & 640 | 0° → −44.9° and 135.1° → −180° | −135° |
| 520 & 660 | 0° → −44.9° and 135.1° → −180° | 45° |
| 540 & 600 | −135.1° → −180° and 0° → 44.9° | −45° |
| 560 & 620 | −135.1° → −180° and 0° → 44.9° | 135° |

On the other hand, if a given color channel is configured to work with one WGP orientation and two LCoS slow-axis orientations are to provide for comparable contrast performance, the selections will come from within series 500s and 600s. As an example, if both −45° and −135°. LCoS slow-axis orientations are required for a −45° aligned WGP system, the optimal slow-axis location of the tilted –C-plate can be selected from configurations 500 and 540. From the experimental contrast entries in Table 3, orientations 507 and 546, providing 6400:1 and 6800:1 contrast respectively are the optimal picks for configurations 500 and 540, respectively. Similar optimal –C-plate retarder axis of rotation for other two slow-axis orientations in neighboring quadrants can be found. The optimal solutions require the choice of the –C-plate slow-axis oriented at substantially parallel to the S-polarization, pointing vertically up for the optical configurations 500s and pointing vertically down for the optical configurations 600s.

Yet another scenario may involve boosting the contrast at the weakest-contrast channel (typically blue channel) and traded off contrast at the more optimal contrast channels (typically green and red channels) for an overall non-colored dark state. The contrast in the blue channel is typically worst because of the substantially poorer performing optics, especially the crossed polarizers and the WGP elements. In this case, the –C-plate retarder meant for the blue channel will be rotated about an axis substantially parallel to the S-polarization, pointing vertically up for the optical configurations 500s and pointing vertically down for the optical configurations 600s, whereas the axis of rotations for green and red channels will be aligned substantially parallel to the P-polarizations (two choices per optical configuration).

The non-equal contrast performance with respect to the alignment of the –C-plate axis of rotation is a result of the birefringence in the WGP element. Whilst a complete numerical model is the ultimate goal, quick experimental verification of the solution space can be more readily done. The errors and repeatability of these contrast numbers are about ±200 points for a nominal of 5000:1 contrast value, i.e., ±4%. The relative contrast values, as a fimction of the slow-axis of the tilted –C-plate that have been observed are significantly beyond this tolerance.

Other embodiments may include the use of inorganic birefringent crystals, cut to a C-plate. The C-plate-only retarder is utilized in such a way to also realize a suitable amount of net retardance in the plane of a microdisplay imager as well as providing a suitable amount of out-of-plane retardance. This tilted crystal C-plate functions much the same as a Berek compensator. Single-crystal plates with small negative birefringence will be appropriate (e.g., single-crystal $MgF_2$ with $\Delta n = -0.01$). The required plate thickness will be in the range of tens of microns, in order to deliver approximately 200 to 500 nm of –C plate retardance.

Figure 15:
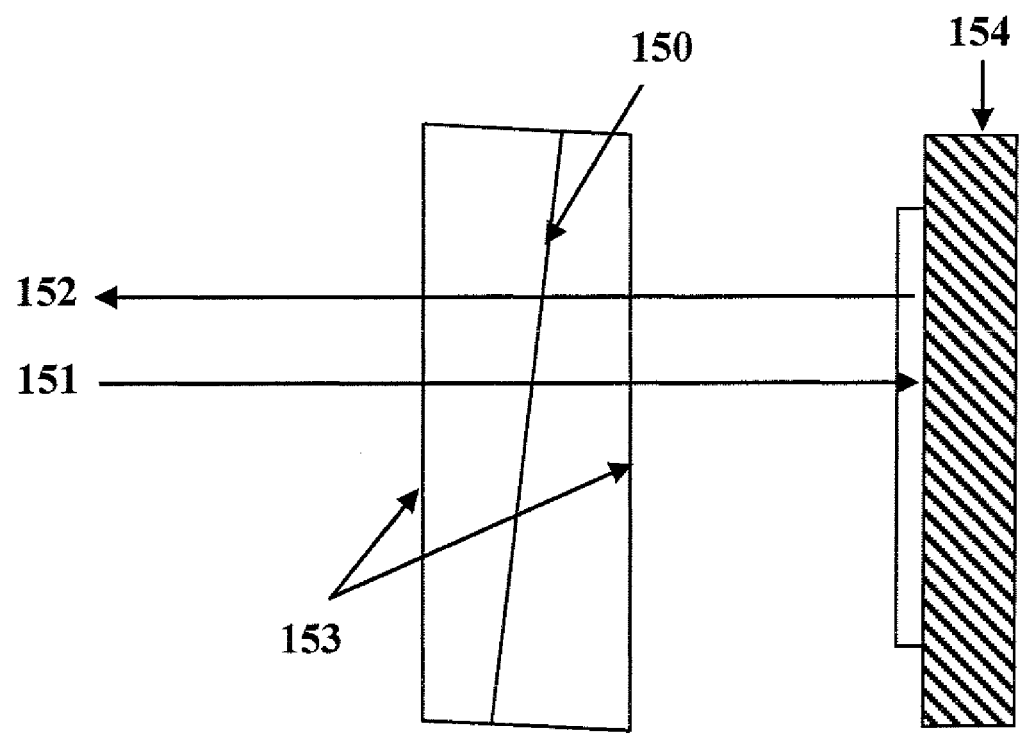
FIG. 15 is a schematic of a +C or −C-plate retarder, sandwiched between two wedged prisms of suitable indices so as to produce a compensator element aligned plane-parallel to the LCoS device. The effective axis of rotation of the C-plate retarder element within the laminate must not be parallel of either the P-polarization or the S-polarization of WGP.

Another embodiment of this invention seeks to sandwich the C-plate plate 150 (for example an FBAR coated plate or a crystal plate) between wedged substrates. This embodiment is shown in FIG. 15. The outer surfaces 153 of sandwiched element are substantially parallel and AR-coated, and the retarder assembly is aligned substantially parallel to the LCoS stage 154. This reduces image quality impairment due to parallax in the first pass beam 151 and the second pass beam 152. The on-axis retardance in this case is induced by having non-zero angle of incidence of the principal ray, with respect to the sandwiched C-plate. Both +C and –C plate can be utilized in this manner, but only the –C-plate is able to simultaneously compensate for the in-plane and out-of-plane retardance of the LCoS dark state. The on-axis performance of the tilted +C-plate can be made as good as the tilted –C-plate compensated LCoS. However, the off-axis rays will see an even larger net retardance than the LCoS panel alone. This +C-plate configuration is only useful for a very limited cone incidence angle.

Figure 16:
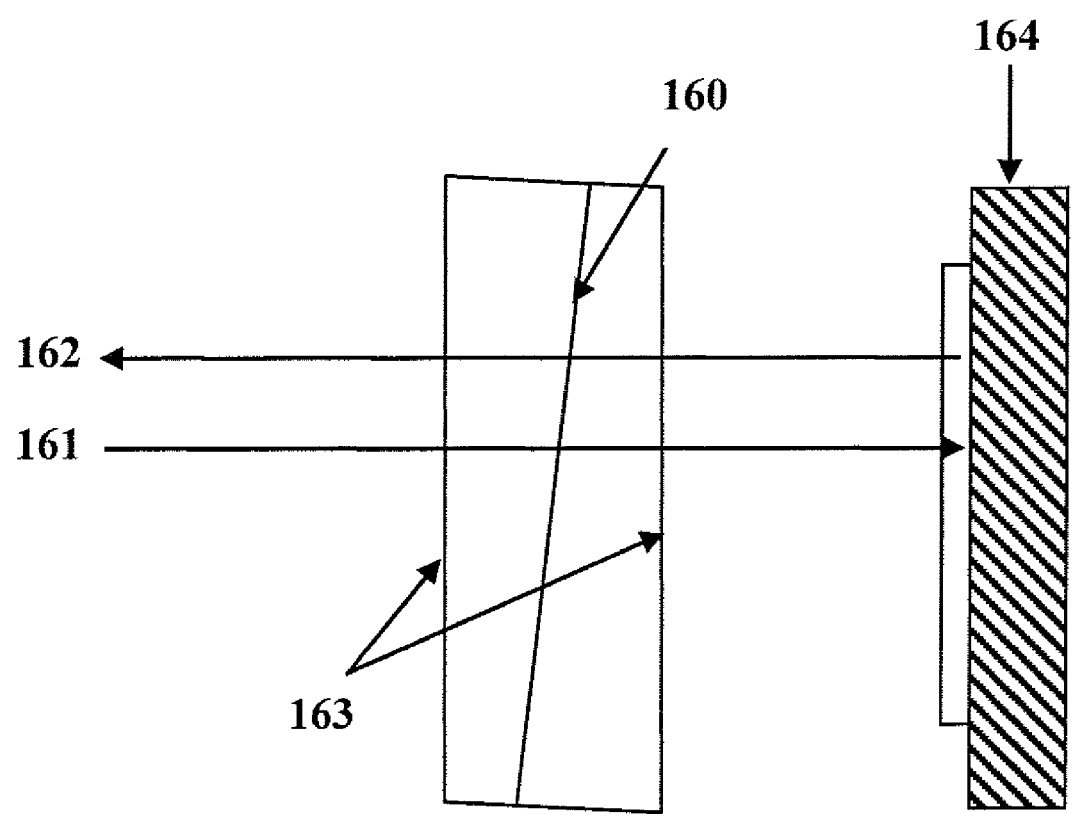
FIG. 16 is a schematic of a +C-plate retarder, sandwiched between two wedged prisms of suitable indices so as to produce a compensator element aligned plane-parallel to the LCoS device. One or both external surfaces are applied with a −C-plate FBAR coating to provide for an overall net −C-retardance. The effective axis of rotation of the C-plate retarder element within the laminate must not be parallel of either the P-polarization or the S-polarization of WGP.

A further embodiment, shown in FIG. 16, uses a tilted +C-plate 160 embedded between wedged substrates to correct for the residual A-plate retardance, and a –C-plate on the normal incidence exterior surface(s) 163 to correct for C-plate retardance in the LC panel 164. The first pass beam and the second pass beam are indicated by 161 and 162 respectively.

In all the applications of immersed and non-immersed C-plate retarder, the effective axis of rotation of the C-plate retarder element must not be parallel to either the P-polarization or the S-polarization of WGP. A retarder element (tilted and non-tilted) with its slow/fast axes aligned parallel to the display system S- and P-plane has its on-axis retardation effect negated by the absence of two modes of beam propagation.

Although simulation and experimentation of the use of a tilted FBAR –C-plate as a compensator for a microdisplay projection system have utilized a reflective VAN-mode LCoS imager, the tilted plate compensator is also suitable for transmissive microdisplay projection system. The tilted –C-plate retarder produces both on-axis retardance and off-axis retardance from a single element. The on-axis retardance can be used to cancel out the residual A-plate retardance of a transmissive display panel, such as TN-mode LCD and VAN-mode LCD. It is noted that the transmissive panels are approx. twice as thick in its LC layer and hence the amount of on-axis retardance required of the tilted C-plate is significantly larger.

Both the imager panel and the tilted −C-plate compensator, when used in single pass transmission, are likely to face issues of asymmetric retardance profile vs. cone angles. In the case of TN-mode panels, the small amount of circular retardance in panel off-state is not compensated by a liner retarder such as a tilted −C-plate.

Figure 17:
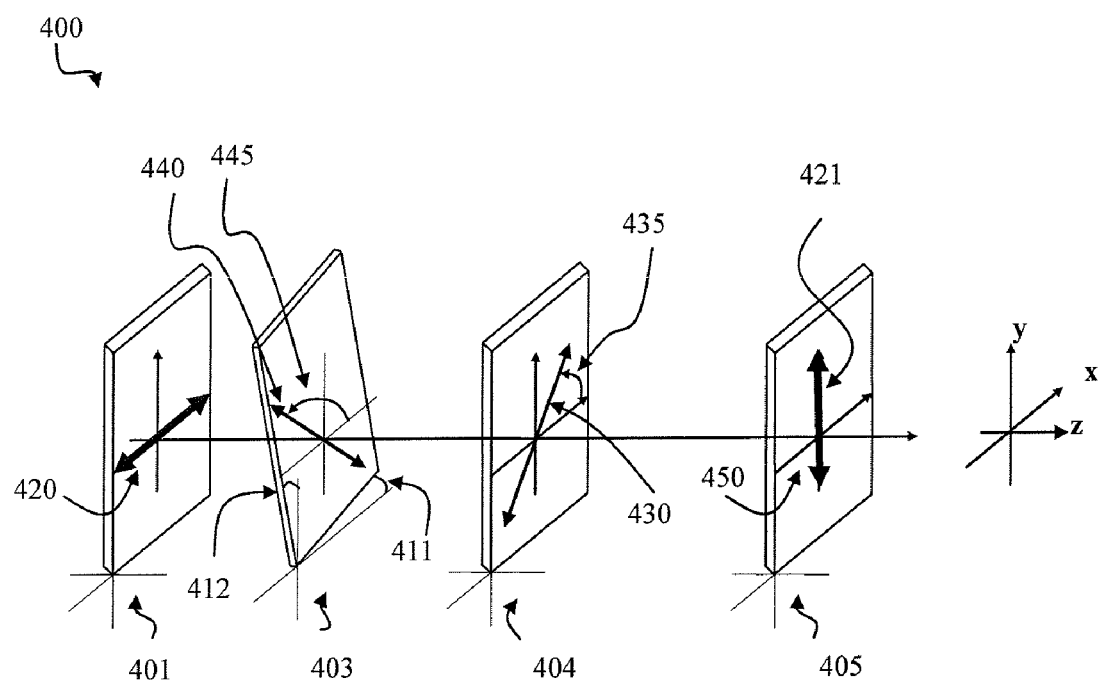
FIG. 17 illustrates a transmissive microdisplay projection system, where one or more of tilted −C-plate is positioned between the incident-side polarizer and the exit crossed-polarization analyzer so as to substantially compensate for the display element retardance for on-axis and off-axis rays.

An embodiment of this invention, incorporating a tilted C-plate in a transmissive optical system, is illustrated in FIG. 17. In core optics 400, the cone of light output from the prior stage light pipe (or other homogenizer such as Fly's Eye Array), is linear polarized by the pre-polarizer 401. The transmission axis of this polarizer 420 can be aligned arbitrarily over the entire circle, more commonly at ±45°, 0° or 90°. The illustration uses a 0° polarization incidence 420. The light passing the pre-polarizer is impinged onto a transmissive LCD imager 404. The imager has its slow axis 430 aligned at ±45° azimuthal offset 435 versus the pre-polarizer transmission axis. This light then exits the system via a post-analyzer 405, with its transmission axis 421 aligned perpendicular to the pre-polarizer axis 420. One or more stages of trim retarder compensator 403 is inserted between the pre-polarizer 401 and the post-analyzer 405. The trim retarder element can be aligned before the imager or after the imager or both. At least one of the trim retarder element utilizes a C-plate-only retarder mounted at a tilt. This tilted element is shown in the optical system 400 positioned before the imager. The combined non-zero tilts of 411 and 412 sets the rotation axis at 440 azimuth. For tilted −C-plate retarder, the associated angle 445 nominally perpendicular to the imager slow-axis 435; or a tilted +C-plate retarder, the associated angle 445 nominally parallel to the imager slow-axis 435. A common practice in retardation compensation is to over-clock the C-plate retarder slow-axis from parallel or perpendicular alignment to the imager slow-axis by implement an over-value compensation scheme.

If the transmissive panel is a VAN-mode imager, the tilt of the −C-plate has to be effected such that the light rays at the tilted −C-plate, along a given azimuthal plane of the cone incidence that see a larger AOI than the principal ray, also experience a larger angular difference with respect to the extraordinary axis (e-wave) of the positive uniaxial VAN-LC material. A single-pass transmissive system will result in some azimuthal dependence in the compensation efficacy. The requirement above helps to mitigate the undesirable effects of having a tilted −C-plate retarder and an oblique LC alignment.

If the transmissive panel is a twisted-nematic (TN) imager, where the total twist angle is less than or equal to approximately 90 degrees, the tilt of the −C-plate retarder has to be effected about an axis of rotation that is substantially orthogonal to the bisector of the TN twist angle range. The magnitude of the tilted C-plate retardance and the size of the polar angle tilt have to be adjusted such that the asymmetry of conoscopic net retardance maps of the tilted −C-plate retarder and the TN cell are well matched. A single-pass transmissive system will result in some azimuthal dependence in the compensation efficacy. The requirement above helps to mitigate the undesirable effects of having a tilted −C-plate retarder and an oblique LC alignment and twist within the TN cell in the dark state.

The present invention has been described above with reference to various exemplary embodiments. However, those skilled in the art will recognize that changes and modifications may be made to the exemplary embodiments without departing from the scope of the present invention. For example, the various elements may be implemented in alternate ways, such as, for example, by providing other optical configurations or arrangements. These alternatives can be suitably selected depending upon the particular application or in consideration of any number of factors associated with the operation of the system. Moreover, these and other changes or modifications are intended to be included within the scope of the present invention, as expressed in the following claims.

We claim:

1. A liquid crystal display projector comprising: a light source; an optical illumination system for converging light emitted by the light source to an optical path having a principal axis; a liquid crystal display panel, oriented in a panel plane and having a slow-axis and a fast-axis therein, for optically modulating the light converged by the optical illumination system; a projection lens for magnifying and projecting the light modulated by the liquid crystal display panel; a first polarizing means, disposed to accept the light converged by the optical illumination system, for transmitting a first linearly polarized light having a first linear polarization axis onto the liquid crystal display panel with on-axis incidence; a second polarizing means, disposed to accept the light optically modulated by the liquid crystal display panel, for transmitting a second linearly polarized light having a second linear polarization axis to the projection lens; and a retardance compensating plate having a uniaxial C-symmetry, rotated away from the panel plane by an acute tilt angle about an axis of rotation and disposed between the liquid crystal display panel and at least one of the first and second polarizing means, wherein the axis of rotation is parallel to the panel plane; wherein one of a slow and a fast axis of the retardance compensating plate is aligned with the axis of rotation; wherein the axis of rotation is non-parallel to the first and second linear polarization axes, and wherein a retardance profile of the tilted retardance compensating plate having uniaxial C-symmetry substantially matches that of the liquid crystal display panel, and wherein the retardance compensating plate includes a dielectric thin-film form-birefringent coating having a plurality of inorganic transparent layers, the dielectric design tailored such that the retardance compensating plate substantially compensates for residual on- axis and off-axis retardance of the liquid crystal display panel.

2. The liquid crystal display projector according to claim 1, wherein the liquid crystal display panel is a transmissive liquid crystal display panel.

3. The liquid crystal display projector according to claim 1, wherein the liquid crystal display panel is a reflective liquid crystal display panel;
    wherein the first and second polarizing means are incorporated in a polarizing beamsplitter with a beam-splitting surface oriented at about 45 degrees from the principal axis, arranged in transmission and reflection respectively; and
    wherein the first and second linear polarization axes are orthogonal.

4. The liquid crystal display projector according to claim 3, wherein the liquid-crystal display panel is a vertically-aligned nematic Liquid Crystal on Silicon (VAN-LCoS) panel.

5. The liquid crystal display projector according to claim 1, wherein the axis of rotation is aligned non-parallel to the slow-axis or the fast-axis of the liquid crystal display panel.

6. The liquid crystal display projector according to claim 1, wherein the azimuthal orientation of the axis of rotation about the principal axis is chosen such that an image generated in the liquid-crystal display panel has an optimum contrast at an exit side of the second polarizing means.

7. The liquid crystal display projector according to claim 1, wherein the slow axis of the retardance compensating plate angle is 45 degrees or 135 degrees from the first linear polarization axis.

8. The liquid crystal display projector according to claim 1, wherein the retardance compensating plate is sandwiched between two wedged prisms, each with a wedge angle that is about equal to the tilt angle, such that the two wedged prisms and the retardance compensating plate form an optical element with plane parallel faces.

9. The liquid crystal display projector according to claim 1, wherein the axis of rotation is oriented such that the slow axis of the retardance compensating plate is in a quadrant neighboring the slow-axis of the liquid crystal display panel.

10. A liquid crystal display projector comprising:
a light source;
an optical illumination system for converging light emitted by the light source to an optical path having a principal axis;
a liquid crystal display panel, oriented in a panel plane and having a slow-axis and a fast-axis therein, for optically modulating the light converged by the optical illumination system;
a projection lens for magnifying and projecting the light modulated by the liquid crystal display panel;
a first polarizing means, disposed to accept the light converged by the optical illumination system, for transmitting a first linearly polarized light having a first linear polarization axis onto the liquid crystal display panel with on-axis incidence;
a second polarizing means, disposed to accept the light optically modulated by the liquid crystal display panel, for transmitting a second linearly polarized light having a second linear polarization axis to the projection lens; and
a retardance compensating plate having a uniaxial C-symmetry, rotated away from the panel plane by an acute tilt angle about an axis of rotation and disposed between the liquid crystal display panel and at least one of the first and second polarizing means,
wherein the axis of rotation is parallel to the panel plane;
wherein one of a slow and a fast axis of the retardance compensating plate is aligned with the axis of rotation;
wherein the axis of rotation is non-parallel to the first and second linear polarization axes,
wherein a retardance profile of the tilted retardance compensating plate having uniaxial C-symmetry substantially matches that of the liquid crystal display panel, and
wherein the retardance compensating plate includes a dielectric thin-film form-birefringent coating having a plurality of inorganic transparent layers, the dielectric thin-film form-birefringent coating deposited on at least one of an entrance surface and an exit surface, the dielectric design tailored such that the retardance compensating plate substantially compensates for residual on-axis and off-axis retardance of the liquid crystal display panel.

11. The liquid crystal display projector according to claim 10, wherein the dielectric thin-film form-birefringent coating is a dielectric thin-film form-birefringent anti-reflective coating and has either a +C-plate retardance or a −C-plate retardance.

12. A liquid crystal display projector comprising: a light source; an optical illumination system for converging light emitted by the light source to a an optical path having a principal axis; a reflective liquid crystal display panel, oriented in a panel plane and having a slow- axis and a fast-axis therein, for optically modulating the light converged by the optical illumination system; a projection lens for magnifying and projecting the light modulated by the liquid crystal display panel; a polarizing beamsplitter with a beam-splitting surface oriented at about 45 degrees from the principal axis, disposed to accept the light converged by the optical illumination system and to transmit a first linearly polarized light having a first linear polarization axis onto the liquid crystal display panel with on-axis incidence; and to accept the light optically modulated by the liquid crystal display panel, and to transmit a second linearly polarized light having a second linear polarization axis, to the projection lens; wherein the first and second linear polarization axes are orthogonal; a first linear polarizer incorporated between the optical illumination system and the polarizing beamsplitter for enhancing a polarization extinction ratio of the first linearly polarized light; a second linear polarizer incorporated between the polarizing beamsplitter and the projection lens for enhancing a polarization extinction ratio of the second linearly polarized light; and a retardance compensating plate having a uniaxial C-symmetry, rotated away from the panel plane by an acute tilt angle about an axis of rotation and disposed between the liquid crystal display panel and the polarizing beamsplitter, wherein the axis of rotation is parallel to the panel plane; wherein one of a slow and a fast axis of the retardance compensating plate is aligned with the axis of rotation; wherein the axis of rotation is non-parallel to the first and second linear polarization axes, and wherein the retardance compensating plate includes a dielectric thin-film form-birefringent coating having a plurality of inorganic transparent layers, the dielectric design tailored such that the retardance compensating plate substantially compensates for residual on- axis and off-axis retardance of the liquid crystal display panel.

13. The liquid crystal display projector according to claim 12, wherein the reflective liquid-crystal display panel is a vertically-aligned nematic Liquid Crystal on Silicon (VAN-LCoS) panel.

14. The liquid crystal display projector according to claim 13, wherein the retardance compensating plate is sandwiched between two wedged prisms, each with a wedge angle that is about equal to the tilt angle, such that the two wedged prisms and the retardance compensating plate form an optical element with plane parallel faces.

15. The liquid crystal display projector according to claim 14, wherein the optical element with plane parallel faces is coated at least on one of the plane parallel faces with a second dielectric thin-film form-birefringent anti-reflective coating having either a +C-plate retardance or a −C-plate retardance.

16. The liquid crystal display projector according to claim 12, wherein the retardance compensating plate is sandwiched between two wedged prisms, each with a wedge angle that is about equal to the tilt angle, such that the two wedged prisms and the retardance compensating plate form an optical element with plane parallel faces.

17. The liquid crystal display projector according to claim 16, wherein the optical element with plane parallel faces is coated at least on one of the plane parallel faces with a second dielectric thin-film form-birefringent anti-reflective coating having either a +C-plate retardance or a −C-plate retardance.

* * * * *